United States Patent [19]

Hengen et al.

[11] 4,198,802

[45] Apr. 22, 1980

[54] AXIAL FLOW ROTARY SEPARATOR FOR A COMBINE

[75] Inventors: Edward J. Hengen, Bettendorf, Iowa; John E. Wilson, Colona, Ill.

[73] Assignee: Deere & Company, Moline, Ill.

[21] Appl. No.: 825,537

[22] Filed: Aug. 18, 1977

[51] Int. Cl.² ............................................. A01D 45/02
[52] U.S. Cl. .................................... 56/14.6; 130/27 T
[58] Field of Search ............................... 56/14.5, 14.6; 130/27 R, , 27 H, 27 HF, 27 HA, 27 Q, 27 T

[56] References Cited

U.S. PATENT DOCUMENTS

| 990,284 | 4/1911 | Miller | 130/27 Q |
|---|---|---|---|
| 3,623,302 | 11/1971 | Schmitt | 56/14.6 |
| 3,808,780 | 5/1974 | Wood | 56/14.6 |
| 4,060,960 | 12/1977 | Hengen et al. | 56/14.6 |
| 4,108,150 | 8/1978 | Sharer | 130/27 H |
| 4,139,013 | 2/1979 | Hengen | 130/27 H |

*Primary Examiner*—Russell R. Kinsey

[57] ABSTRACT

In a rotary separator, cylindrical threshing, frusto-conical separating, and centrifugal fan sections are arranged coaxially and in tandem. A fixed grate including threshing and separating portions surrounds and generally conforms to a rotor profile. A frusto-conical collector housing encloses the forward part of the separator and feeds threshed and separated grain to a grain cleaning unit, the screen elements of which, along with the collector housing, rotate concentricaly with the grate while at the same time reciprocating axially. A stationary cylindrical housing surrounds the cleaner unit and clean grain and tailings pass centrifugally from the cleaner screens to separate annular channels, to be swept around the inside of the housing by paddles moving with the cleaner elements to tangential discharge points near the top of the separator for transfer to clean grain and tailings return augers respectively. The centrifugal fan draws air approximately axially through the cleaner unit removing chaff and other light material and also receives straw carried over the grate, for discharge downwards from the fan housing.

62 Claims, 13 Drawing Figures

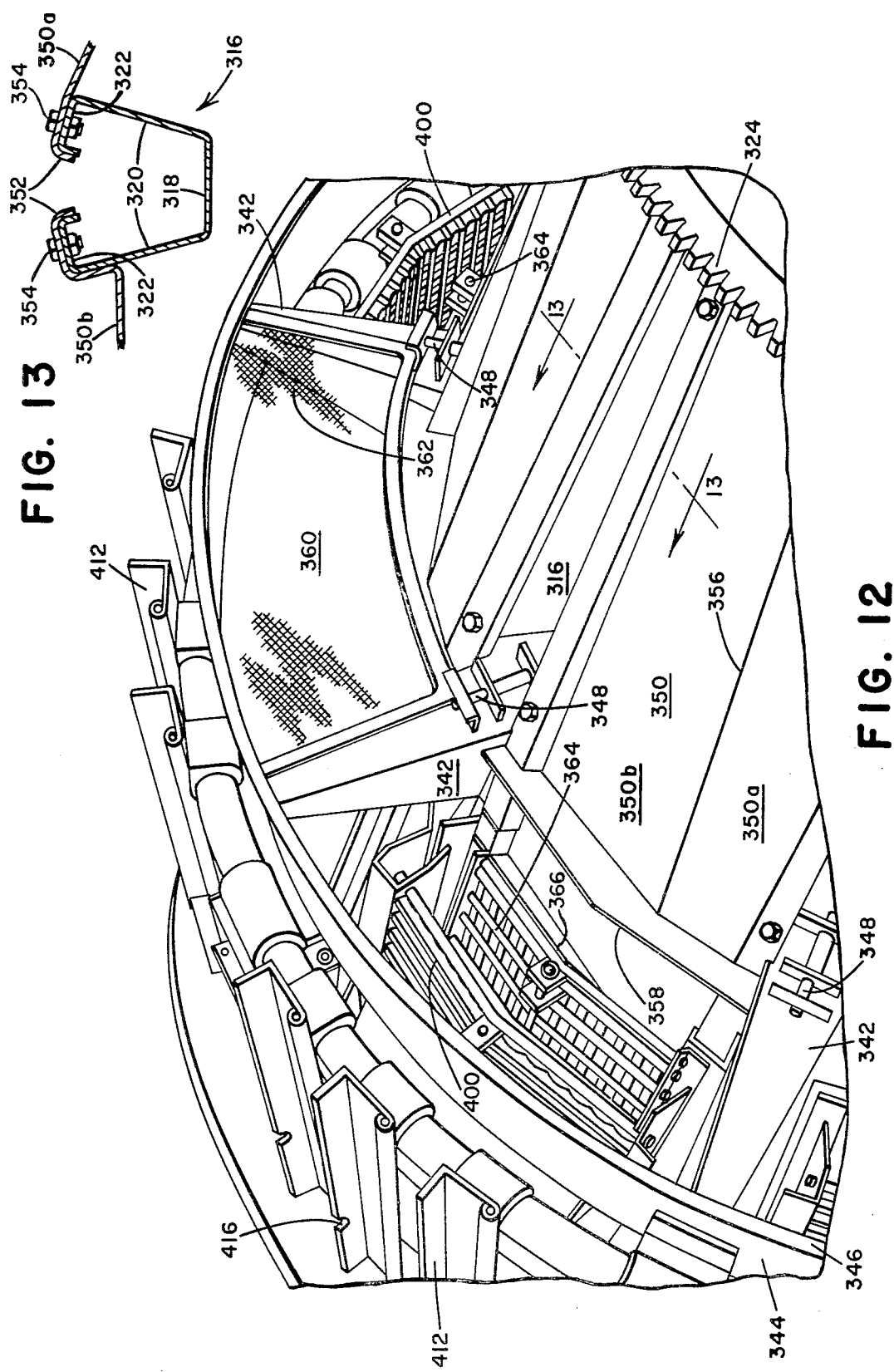

4,198,802

AXIAL FLOW ROTARY SEPARATOR FOR A COMBINE

BACKGROUND OF THE INVENTION

This invention relates to axial flow rotary separators for separating grain from a mass of crop material and more particularly to such a separator embodied in a combine and including threshing and cleaning sections.

Combines in which coaxial threshing and separating sections process grain delivered upwardly and rearwardly to them by the gathering and feeder units of a header are well known. It is also known to combine such units with a coaxial centrifugal fan disposed rearwardly (downstream) of the separator to provide cleaning air and to discharge straw ejected by the separator. However, in these combines, particularly where a coaxial fan is not included, it it typical to combine the axial flow rotary threshing and separating units with a cleaner having planar reciprocating screens, a cleaner design which has been conventional in threshing machines and combines using straw walker type separators for many years. Such cleaners and straw walkers, relying in part on gravity for control of the crop material being processed, are slope-sensitive and lose efficiency when the combine is operated on sloping ground. Attempts to include a rotary cleaning section in a rotary separator have usually been limited to a rudimentary revolving cylindrical drum.

In some existing combines having rotary separators there may be substantial centrifugal discharge of material over 360° of arc from a rotating element, but typically such material is collected in the lower part of the separator by gravity and separate conveyors must be used to move the material to the next separating stage or to a cleaner. Other rotary separators already known rely for cleaning on centrifugal action produced by simple rotary motion plus aerodynamic means, or on the tumbling action produced by relatively slower rotation assisted in some cases by reciprocation of the revolving drum. When tumbling action is used to produce agitation, as in a revolving drum, only a part (the lower portion of the drum) of the total separating surface provided is in use at any one time.

The potential advantages of rotary separation and cleaning over conventional separators using straw walkers and reciprocating planar shoes in the cleaner are absence of slope sensitivity and inherently greater specific capacity in terms of rate of work per unit of separator volume. These advantages are not fully realized if the rotary elements are not rotated at such a speed that, through centrifugal action, their entire surfaces are in use at all times. And if a conventional reciprocating shoe type cleaner is used in conjunction with rotary threshing and separating, a disproportionately bulky cleaner is required to match the capacity of the rotary separating unit and the advantages of high specific capacity and slope insensitivity are both partially nullified.

SUMMARY OF THE INVENTION

Accordingly, an object of this invention is to provide a compact efficient axial flow rotary threshing, separating and cleaning combination for a combine that more nearly realizes the potential of such units for high specific capacity, absence of slope sensitivity and efficient materials handling.

It is a feature of the invention to use only three major moving assemblies in combining the primary threshing and separating rotor and grate of an axial flow unit, including a coaxial downstream fan, with an auxiliary annular rotating and reciprocating separating element surrounding the downstream end of the primary separator and a rotating and reciprocating cleaner unit surrounding the middle portion of the separator outside of and partially overlapping the auxiliary separating element, both additional units being contained within the length of the primary separator and preferably within the outside diameter of the fan. A collector housing, integral with the cleaner unit, surrounds the front portion of the separator and intercepts and conveys separated grain and chaff to the cleaner unit.

It is important that the rotary elements are rotated at such speed that no tumbling action occurs but rather that centrifugal forces significantly exceed gravitational forces over the full 360° of the elements so that full use is made of all the separating surfaces. Axial propulsion of the crop material is achieved in general by means of fixed helical material moving elements mounted on cooperating adjacent separating stationary and moving surfaces and, in the case of material carried on the inner surfaces of frusto-conical elements, by a tendency to move axially due to centrifugal force, seeking a path of larger diameter. Hence, transfer between stages of the separator relies upon centrifugal forces and on fixed material control elements and an external conveyor is needed in the processing stage only to return tailings to the infeed section for reprocessing. It is a feature of the invention to minimize grain damage by avoiding the use of conventional conveyors for transfer between processing stages and also by reducing rapid accelerations and decelerations of crop material.

The effective use of centrifugal forces to control material movement over the whole 360° of all elements means that discharge points may be selected anywhere on the periphery of the separator. Hence, a feature of the invention is to discharge clean grain from the cleaner section directly into a short auger conveyor adjacent the top of the separator for delivery rearward and upward directly into a grain tank. Another feature is that tailings may be discharged from a point in the upper half of the separator so that a simple straight auger, parallel to the separator axis and with a gravity delivery may be used to transfer tailings from a discharge point towards the rear of the separator back to the forward infeed section.

Features of the invention contributing to compactness and to efficiency of separation and power utilization are:

a. The annular auxiliary separating element or chaffer cover which intercepts or collects material expelled centrifugally from a rear portion of the primary separator and separates out tailings and discharges them centrifugally to be intercepted and deflected or funneled to a tailings discharge channel. In this way the cleaner proper is left to deal only with the relatively grain-rich material discharged (centrifugally) from the threshing section and the forward portions of the primary separator. Further, the effective shielding or covering of the rearward portion of the primary separator means that the cleaner can be accommodated within the length of the primary separator (partially overlapping and concentrically outside the auxiliary separating element or chaffer cover).

b. The close grouping of the screens of the cleaner and auxiliary separating element which facilitates (i) provision of a drive arrangement for giving them axial reciprocating motion for agitation to improve their separating efficiency and (ii) delivering tailings from both the cleaner and the auxiliary separator to a common discharge channel.

c. Having all material in the separator controlled at least in part by centrifugal forces which facilitates tangential discharge of both clean grain and tailings into separate conveyor augers having axes generally parallel to the separator, with the axial extent of the receiving openings in the conveyor housings matching those of the discharge openings in the separator so that transfer of material is made without any power consuming constriction or diversion of flow.

d. An annular air inlet encircling the separator, upstream of the cleaner and auxiliary separator screens and rotating with cleaner, which provides unimpeded entrance for cleaning air drawn by the fan, to flow nearly axially and annularly over the cleaner and auxiliary separator screens thus carrying trash directly to the centrifugal fan, immediately downstream, for ejection from the fan housing and from the separator.

e. Provision of an annular shroud or housing extending from the delivery end of the primary separator grate, and discharge hammers carried by the fan hub extending into the shroud to engage straw discharged by the primary separator and accelerate it to the rotational speed of the fan before releasing it through an opening in the shroud tangentially into the fan blades to be discharged along with trash from the cleaner and auxiliary separator screens. The nearly equal tangential speeds of the straw and fan blades when making contact reduces the energy impact loss compared with that which would occur if straw was released directly into the fan with a relatively slower tangential speed directly from the primary separator.

f. Providing separate driving means for rotation and reciprocation of the cleaner and auxiliary separating elements so that speed of rotation may be varied independently of frequency of reciprocation.

g. Particularly inclining the surfaces of the grain pan and cleaner chaffer and sieve elements relative to the direction of rotation so as to maintain even distribution of material on them.

BRIEF DESCRIPTION OF THE DRAWINGS

FIG. 10 is an enlarged partial front view taken from FIG. 7, of a portion of a yoke-like front support for the rotatable and reciprocable portion of the separator, showing the means for adjusting the radial pressure exerted by rollers in that support.

FIG. 12 is a right hand front three-quarters perspective view of an upper portion of the rotary separator with some air inlet screens and the cleaner housing removed to show internal detail.

FIG. 13 is a partial sectional view on line 13—13 of FIG. 12 showing a typical section of a cleaner rib and adjoining grain pan elements.

DESCRIPTION OF THE PREFERRED EMBODIMENT

Figure 1:
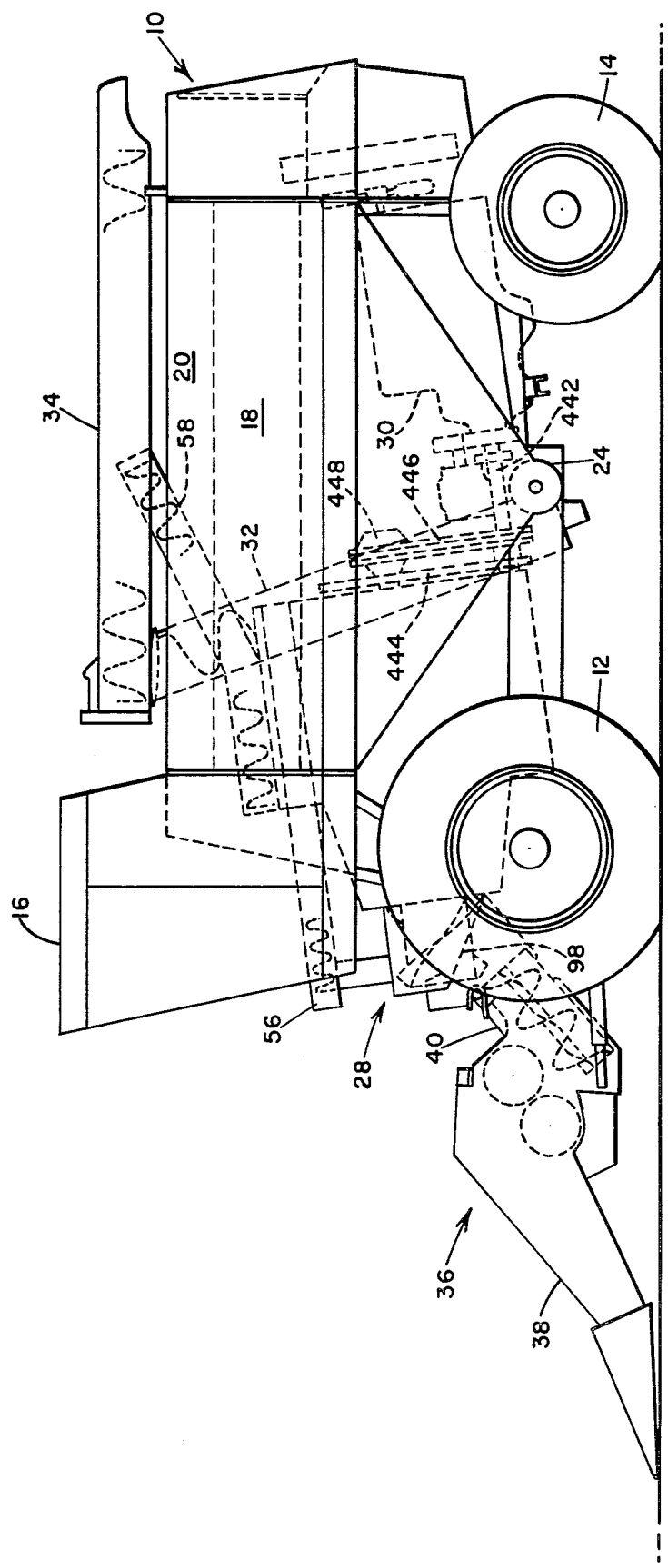
FIG. 1 is a side elevation of a combine embodying the invention.
Figure 2:
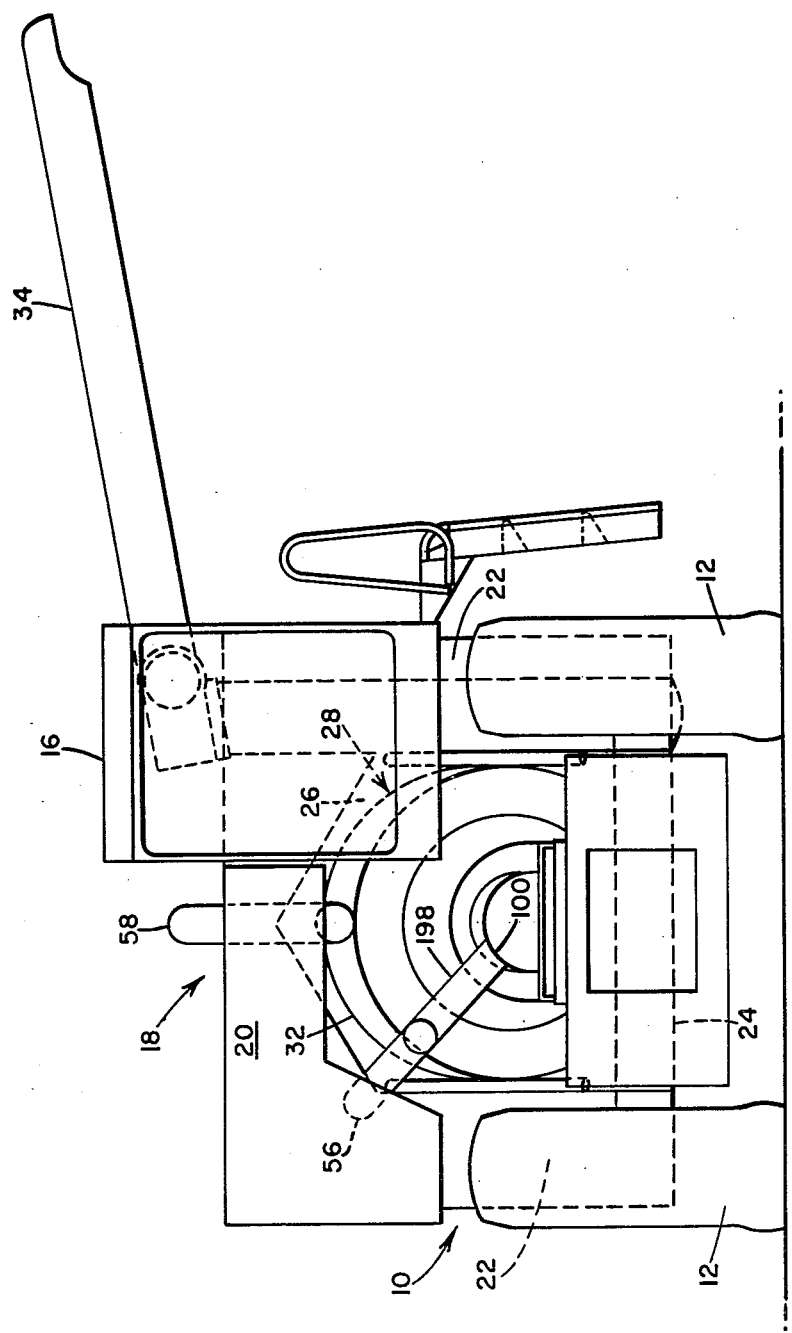
FIG. 2 is a front elevation of the combine.

The invention is embodied in a self-propelled combine having a main separator body indicated generally by the numeral 10 and supported by a pair of laterally spaced forward drive wheels 12 and steerable rear wheels 14 (FIGS. 1 and 2). An elevated operator's station 16 is mounted forward on the body, towards the left hand side of the machine and immediately ahead of a saddle-type grain receptacle or tank 18. The tank includes an elevated central section 20 and opposite depending or saddle portions 22, the tank straddling the machine and cooperating with a transverse auger housing 24 and other transverse frame members (not shown), generally at the level of the auger housing 24, so as to enclose a tunnel-like space 26. Substantially within this space are a forward mounted rotary separator or crop processing unit, indicated generally by the numeral 28, and a rear mounted engine 30 providing power for propelling the combine and driving all its components. A grain unloading system includes a vertical auger conveyor 32 and a swingable unloading auger conveyor 34. A combine of this general construction is described more fully in co-pending patent application Ser. No. 679,344, now U.S. Pat. No. 4,060,960, assigned to the assignee of the present application.

Mounted immediately ahead of the separator 28 is a header 36 including a gathering unit 38 (shown in FIG. 1 only), for gathering a crop as the combine advances over a field and delivering crop material to a feeder house 40, which in turn delivers it rearwardly and upwardly to the front of the rotary separator 28. A feeder house of a type suitable for feeding a rotary separator is described fully in co-pending application Ser. No. 736,440, now U.S. Pat. No. 4,087,953, also assigned to the assignee of the present application.

The general arrangement and principal components of the rotary separator 28 are best described with reference to the diagrammatic FIG. 3. The principal stationary components are the grate and inlet housing 42, the circular mounting assembly 44, the cleaner or collecting housing 46 and the fan housing 48, rigidly connected together and supported in the tunnel-like space 26 by brackets connected to transverse frame members (not shown) of the combine at front and rear and to the grain tank 18 so as to contribute to the structural integrity of the combine body 10. A rotor indicated generally by the numeral 50 is surrounded by the grate and inlet housing assembly 42 and mounted for rotation within it and radial clearance is provided between them to create an axially extending annular space. A grain pan and cleaner assembly indicated generally by the numeral 52 surrounds and rotates around the grate 42 and partially within the housing 46 and also reciprocates axially. A centrifugal fan assembly indicated generally by the numeral 54 is mounted immediately to the rear of the rotor assembly 50 and coaxial with it. Referring now to FIG. 4, a tailings auger indicated generally by the numeral 56 recirculates tailings for rethreshing. A clean grain auger indicated generally by the numeral 58 delivers clean grain rearwards and upwards to the grain tank 18, and straw and chaff are discharged downwards by the fan assembly 54 from the fan housing 48.

Considering the separator 28 in more detail and referring particularly to FIG. 4, the rotor assembly 50 includes front and rear splined stub shafts 60 and 62 respectively, each mounted rigidly and coaxially in the opposite ends of a central rotor tube 64. Mounted on the tube 64 are a number of radially extending frame elements such as the disks 66 and the spider-like members 68 providing surfaces generally concentric with the rotor shafts 60 and 62 for supporting the principal functional elements of the rotor.

The rotor assembly 50 also includes a forward cylindrical section having an infeed portion indicated generally by the numeral 70 and a threshing portion indicated generally by the numeral 72, and a rearward frusto-conical separating section indicated generally by the numeral 74. In the infeed portion 70, helical flighting 76 is carried on a cylindrical drum 78, the flighting reaching a short distance into the threshing section 72 where the functional elements consist of two diametrically opposed pairs of threshing rotor bars 80 (only one pair shown in FIG. 4), each carrying on its surface a plurality of angled material control elements or ribs 82. The functional elements of the separating section 74 of the rotor, which is immediately adjacent the threshing section, include a plurality of approximately equally circumferentially spaced separating rotor bars 84 such as the eight indicated here, each of which carries on its external surface a plurality of angled material control elements or ribs 86.

The separator 28, as indicated above is integrated into the structure of the combine, and has no conventional frame of its own. However, the grate and inlet housing assembly 42 and the circular mounting assembly 44, which are connected rigidly together and each attached rigidly to the combine body 10, in effect form a skeleton upon which much of the rest of the separator unit is either supported or piloted. The grate and inlet housing assembly 42 includes a cylindrical threshing section 88 having an infeed housing 90 extending forward from it and a frusto-conical separator section 92 extending rearward. The infeed housing 90 includes a cylindrical wall 94 on the inside of which are mounted helical material control elements 96. A lower forward portion of the housing is cut away to provide an opening 98 communicating with the feeder house 40 by way of a transition housing (not shown) and providing entry for crop material into the separator 28. A tailings inlet 100, a rectangular opening in the right hand side of the infeed housing wall 94, provides entry for tailings. The housing 90 is rigidly supported above a transverse frame member of the combine body 10 by mounting brackets (not shown).

The forward or upstream part of the threshing section 88 includes a cylindrical wall 102 extending concentrically rearward from the wall 94 of the infeed housing and enclosing somewhat less than half the length of the threshing section. The remainder of the threshing section is a cylindrical grate 104 having a foraminous wall composed of rectangular cross section longitudinal spacer bars 106 supporting spaced round rods 108 arranged in a spiral pattern and extending also over the inside of the cylindrical wall 102 of the threshing section. An axially extending annular flange 110 connects the rearward ends of the spacer bars 106 and spiral rods 108 and serves as a connecting ring for the separating section 92 of the grate assembly 42.

The construction of the separating section 92 is similar to that of the grate portion 88 of the threshing section and includes a forward axially extending connecting ring 112 overlapping and attached rigidly to the threshing ring 110, longitudinal spacer bars 114, spiral rods 116 and a rearward radially extending annular flange 118, the front and rear flanges 112 and 118 connecting the ends of the spacer bars 114 and providing anchorage points for the ends of the spiral rods 116. Attached rigidly to the rear separator flange 118 and extending rearwardly from it is an inner discharge housing 120, being a portion of a cylindrical wall extending only about 270° of arc so as to leave a discharge opening 121 (shown best in FIG. 6) into the fan housing 48 on the right hand side of the separator. The discharge housing 120 has a diameter slightly greater than the internal diameter of the rearward end of the separator section 92 of the grate. Also attached rigidly to the rearward side of the flange 118 are four forwardly offset separator support straps 122 approximately equally spaced and extending radially outwards.

Figure 5:
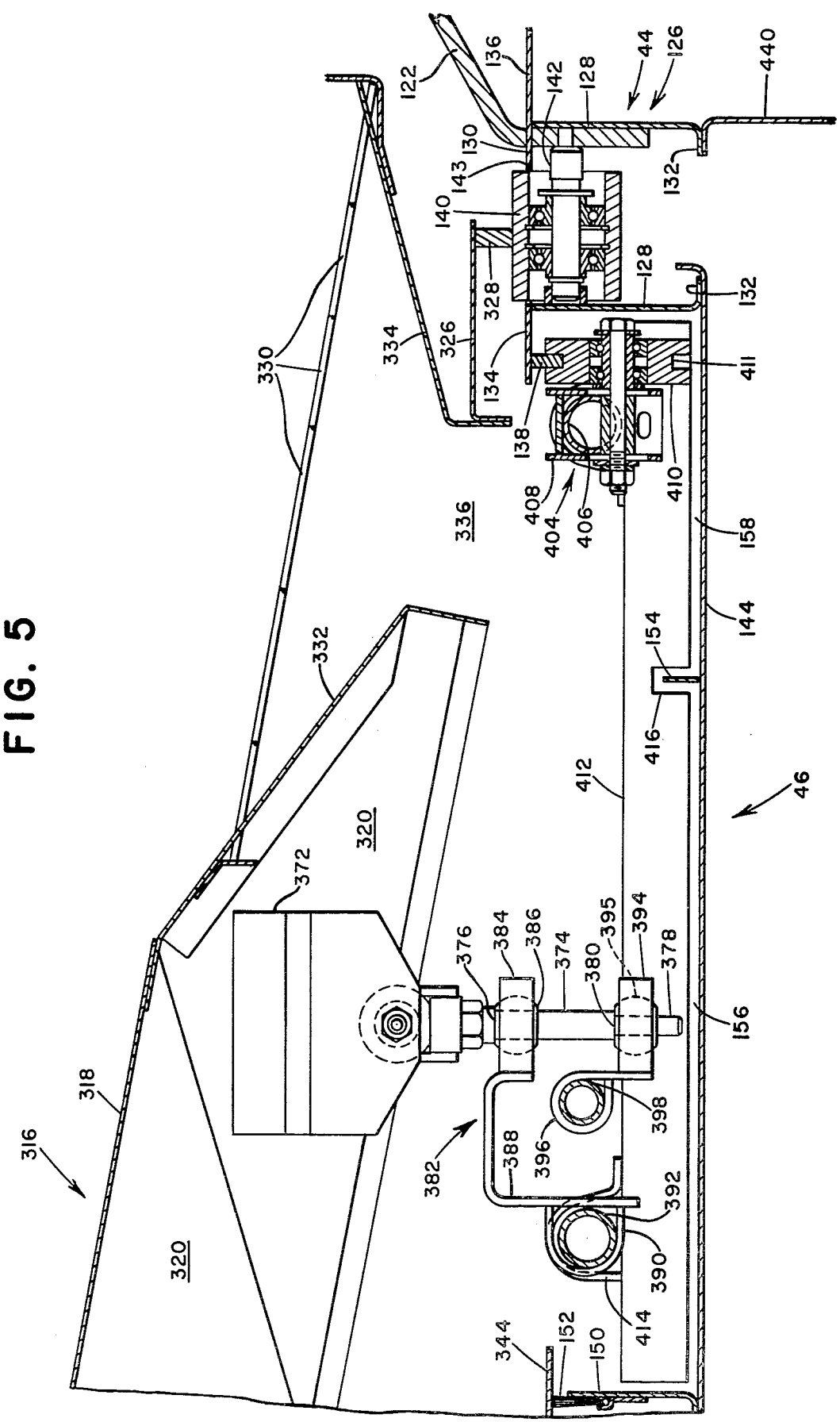
FIG. 5 is a further enlarged semi-schematic sectional view from the left of the cleaner assembly with the chaffer and sieve elements omitted to show particularly components controlling the movement of the several parts of the cleaner.

The circular mounting assembly 44, best shown in cross section in FIG. 5, is attached rigidly to the forward side of the outer ends of the separator support straps 122 and includes an annular member 126 of channel cross section, concentric with the grate assembly 42. The channel section includes opposite radially extending side walls 128 and a cylindrical bottom wall 130. Opposite annular flanges 132 extend axially into the channel from the outer edges of the side walls 128. The bottom wall 130 of the annular channel member 126 extends beyond the side walls 128 creating forward and rearward flange-like extensions 134 and 136 respectively, and an annular guide rib 138 is attached rigidly to the outside of the forward flange-like extension 134, somewhat inset from its forward edge. Two rollers 140 are mounted in the annular channel member 126, each journaled on a spindle 142 carried by the channel side walls 128 parallel to the separator axis and placed so that each roller projects radially inwards through a hole 143 in the bottom wall 130. The rollers are carried on opposite sides of a vertical centerline, each about 45° above bottom dead center of the circular mounting assembly 44. The annular channel member 126 is rigidly attached to the combine body 10 by four brackets (not shown in the drawings) approximately equally spaced around its perimeter.

Figure 6:
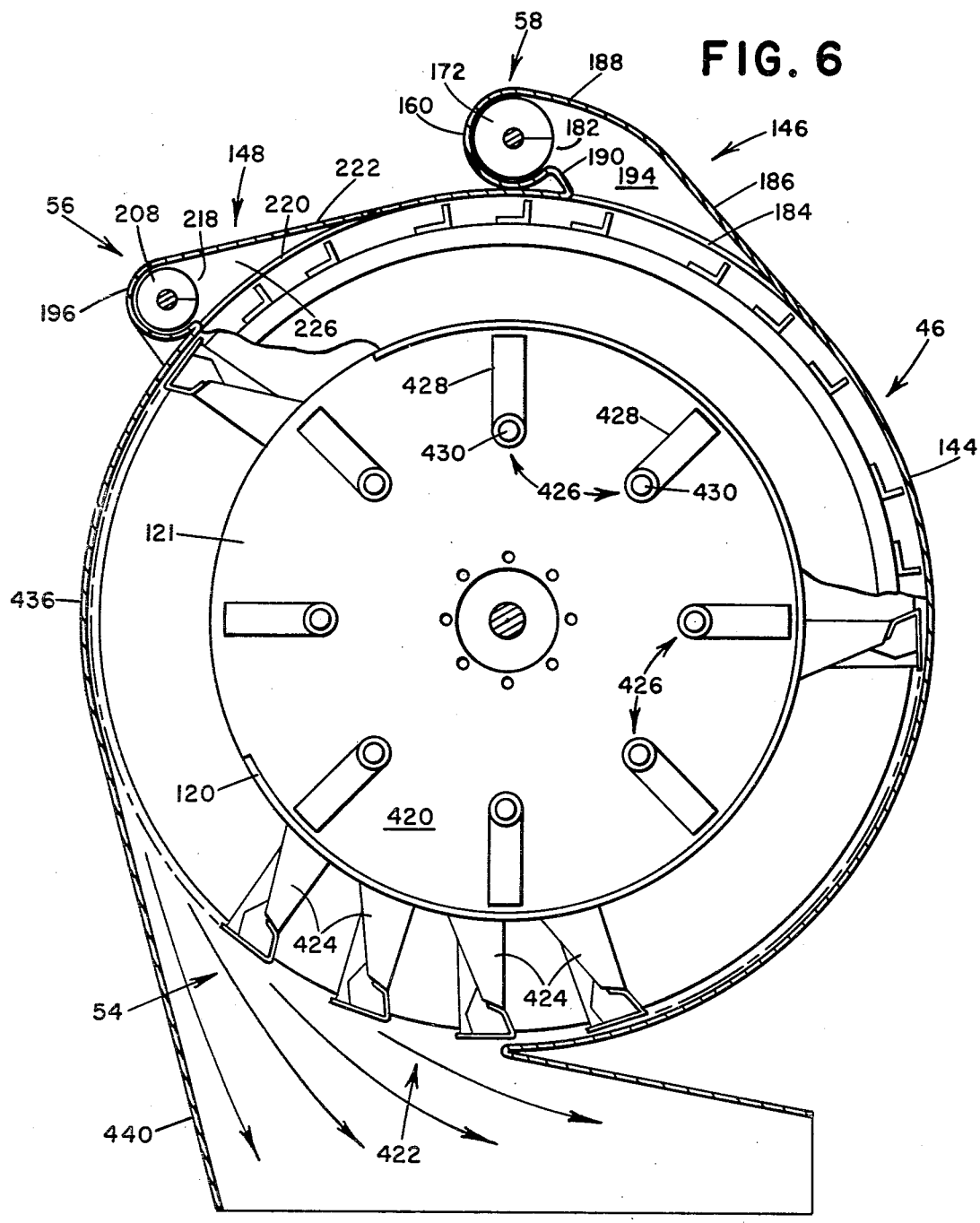
FIG. 6 is a schematic sectional view approximately on line 6—6 of FIG. 4 showing provisions for discharge of clean grain, tailings and trash.

Extending forward from and attached rigidly to the outer forward flange 132 of the annular channel member 126 is the cleaner housing 46, having a wall 144 concentric with the grate assembly 42 and generally cylindrical except that it is interrupted in the upper part of the separator in two places to connect respectively with a clean grain discharge housing or outlet 146 and a tailings discharge housing or outlet 148 as indicated in FIG. 6.

An annular sealing flange 150 is mounted on the inside of the cleaner housing wall 144 near its forward edge, extending radially inwards from it, and having an annular resilient sealing element 152 such as a wall of brush bristles attached to and extending radially inward from its inner edge. An annular radially extending divider rib 154 is attached to the inside of the cleaner housing wall 144 approximately two-thirds of the distance between the sealing flange 150 at the forward end and the forward wall 128 of the channel member 126 at the rearward end and divides the space inside the housing wall into a clean grain conveying channel 156 forward and a tailings conveying channel 158 rearward of the dividing rib.

Referring now to FIGS. 4 and 6, the tubular housing 160 of a receiving portion of the clean grain auger conveyor 58 is mounted at top dead center of the cleaner housing 46 and extends axially the full length of the cleaner housing. Its forward end is closed by a bulkhead 162 approximately aligned with the sealing flange 150 of the cleaner housing 46 and carries in its center a bearing 164. The rear end of the receiving auger housing 160 extends slightly beyond the rear end of the cleaner housing 46 and is cut at an angle so that an external flange 166 mounted on its end lies in a plane forwardly inclined and transverse relative to the separator. The tubular housing 168 of a delivery portion of the clean grain auger conveyor 58 carries at its forward end an external flange 170 matching the flange 166 on the receiving portion, the two auger housing portions being rigidly attached to each other by means of the flanges, the delivery portion thus being inclined rearwardly and upwardly and extending into the upper portion 20 of the grain tank 18 as shown in FIG. 1. Receiving and delivery auger sections 172 and 174 respectively, are rotatably housed in the auger housings 160 and 168 respectively, drivably connected by a universal joint 176 at the junction between the two housing portions. A forwardly extending shaft 178 of the receiving auger section 172 is journaled in the bearing 164 and carries, immediately forward of the bulkhead 162, a drive sprocket 180. A receiving opening 182 in the left hand side of the receiving auger housing 160 extends from approximately top dead center to a point about 45° above bottom dead center of the housing, having a rearward edge approximately aligned with the divider rib 154 of the cleaner housing 46 and a forward edge defined by the auger housing front bulkhead 162.

As mentioned above, the cylindrical form of the cleaner housing 46 is interrupted by openings into discharge housings 146 and 148, for clean grain and tailings respectively. The clean grain discharge opening 184 in the cleaner housing wall 144, best seen in FIG. 6, extends axially between the divider rib 154 at the rear and the sealing flange 150 at the front and circumferentially from a point on the left hand side of the housing at about 45° from top dead center to a point adjacent the lower edge of the receiving opening 182 of the auger housing 160. The clean grain discharge housing 146 includes an outer wall having a planar portion 186 connected to the cleaner housing wall 144 at, and extending tangentially from, the lower edge of the clean grain discharge opening 184, and a curved portion 188 tangential to and connected between the planar portion 186 and the top of the receiving auger housing 160 at the upper edge of the receiving auger housing opening 182. A cut-off wall 190 extends between the upper edge of the opening 184 of the cleaner housing 46 and the lower edge of the receiver opening 182. The clean grain discharge housing 146 also includes front and rear walls 192 and 194 respectively (as indicated in FIGS. 6 and 8), approximately aligned with the sealing flange 150 and the divider rib 154 respectively, and extending and connected between the outer wall portions 186 and 188 and the cleaner housing wall 144 so as to form a grain-tight structure.

The tailings return auger conveyor 56 is mounted on the outside of the cleaner housing wall 144 extending axially at a point approximately 45° away from top dead center of the housing on the right hand side of the machine. The tailings return conveyor 56 includes a tubular auger housing 196 having a rearward end approximately aligned with the forward side wall 128 of the annular channel member 126 and a forward end extending somewhat beyond the front of the infeed housing 90 as shown in FIG. 4. The forward end of the tailings return conveyor housing 196 is cut away to receive a tailings delivery chute 198 of rectangular cross section, attached so as to make a closed conveyor junction between the conveyor housing and the chute. The delivery chute 198 extends downwards and towards the left (see FIG. 2) and connects with the tailings receiving opening 100 of the infeed housing wall 94 as shown also in FIGS. 4 and 7. The forward wall 200 of the tailings delivery chute 198 extends into the cutaway portion of the conveyor housing 196 to form a bulkhead 201 which carries a bearing 202 concentric with the housing (best seen in FIG. 8). A rear bulkhead 204 closes the rear end of the conveyor housing 196 and carries a bearing 206 also concentric with the housing 196. A tailings conveyor auger 208 is mounted for rotation in the housing 196 and extends the full length of the housing between the front and rear bulkheads 201 and 204 respectively, and has front and rear extending auger shafts 210 and 212 respectively, journaled in the bearings 202 and 206, and carrying respectively, rigidly attached drive sprockets, 214 and 216.

The general arrangement of the tailings discharge housing 148 is similar to that of the clean grain discharge housing 146 (FIG. 6). A receiving opening 218 in the left hand side of the tailings conveyor housing 196 extends between the divider rib 154 of the cleaner housing 46 and the forward side wall 128 of the annular channel member 126 with its upper edge at approximately top dead center of the conveyor housing and its lower edge at approximately 45° away from bottom dead center on the left hand side. The tailings discharge opening 220 in the cleaner housing wall 144 also extends between the divider rib 154 and the forward wall 128 of the annular channel member 126 and has its upper edge just to the right of top dead center of the cleaner or collecting housing 46 and its lower edge coinciding approximately with the lower edge of the receiving opening 218 in the tailings return conveyor housing 196. The tailings discharge housing 148 includes a planar outer wall 222 approximately tangential to both the cleaner housing wall 144 and the tailings return auger housing 196 at the upper edges of their respective discharge and receiving openings, 220 and 218. The housing 148 also includes front and rear walls, 224 and 226 (indicated in FIGS. 6 and 8), approximately aligned with the divider rib 154 and the front wall 128 of the annular channel member 126 respectively, and extending between and attached to the cleaner housing wall 144, the tailings auger housing 196 and the outer wall 222, so as to form a grain-tight structure.

Figure 7:
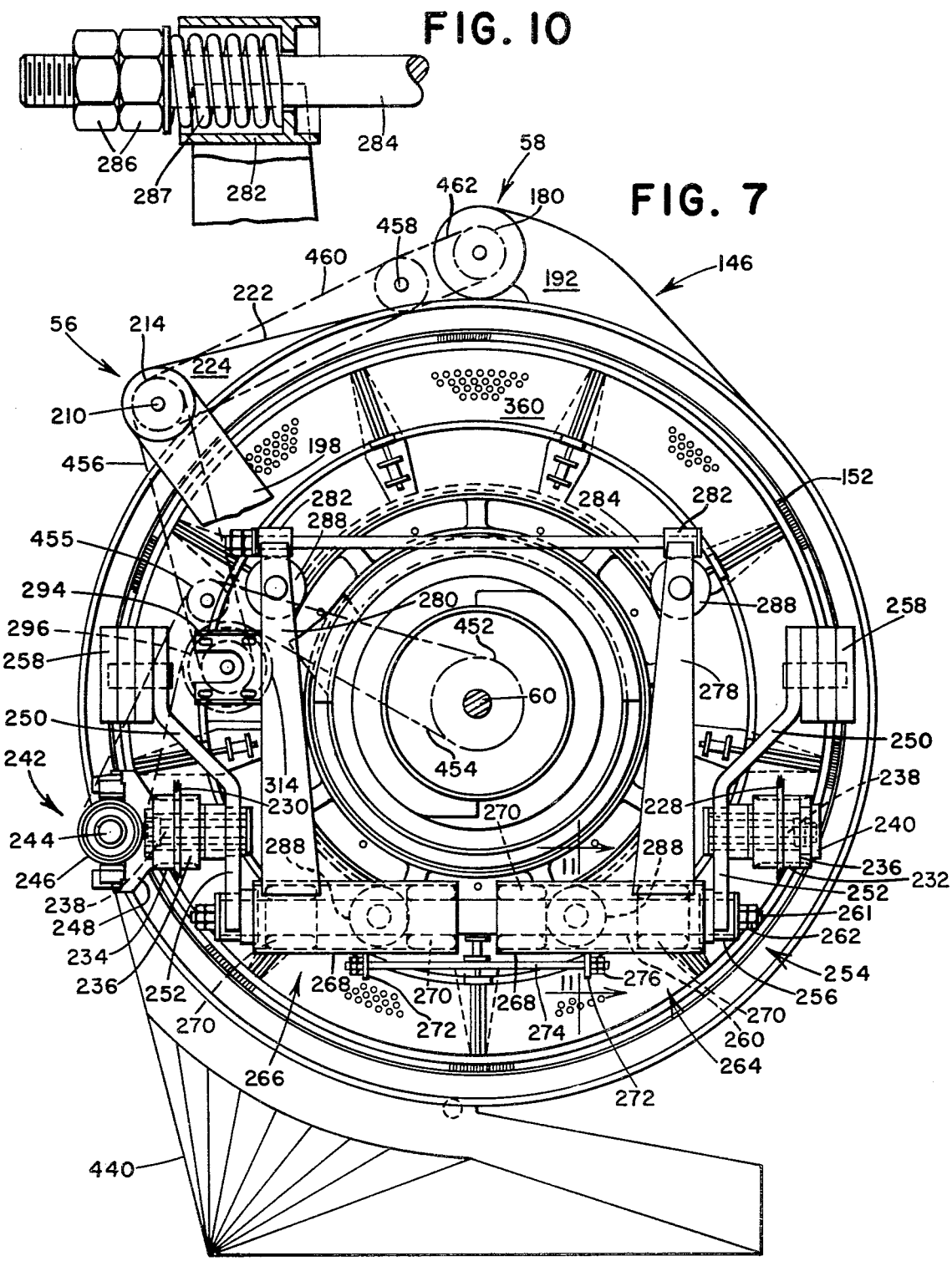
FIG. 7 is an enlarged semi-schematic front elevation of the rotary separator unit with some frame and drive components omitted for greater clarity.
Figure 8:
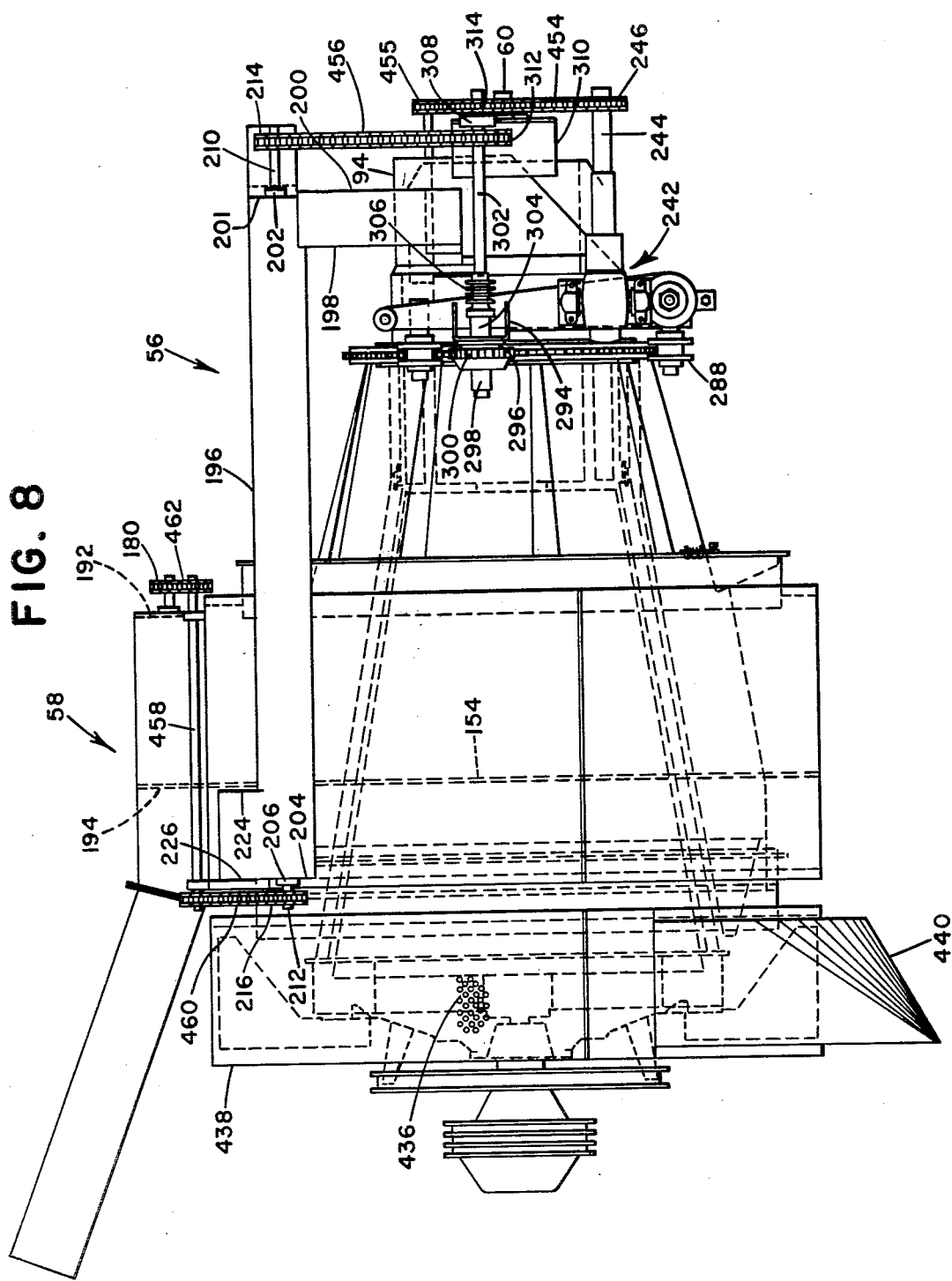
FIG. 8 is an enlarged right side elevation of the rotary separator.
Figure 9:
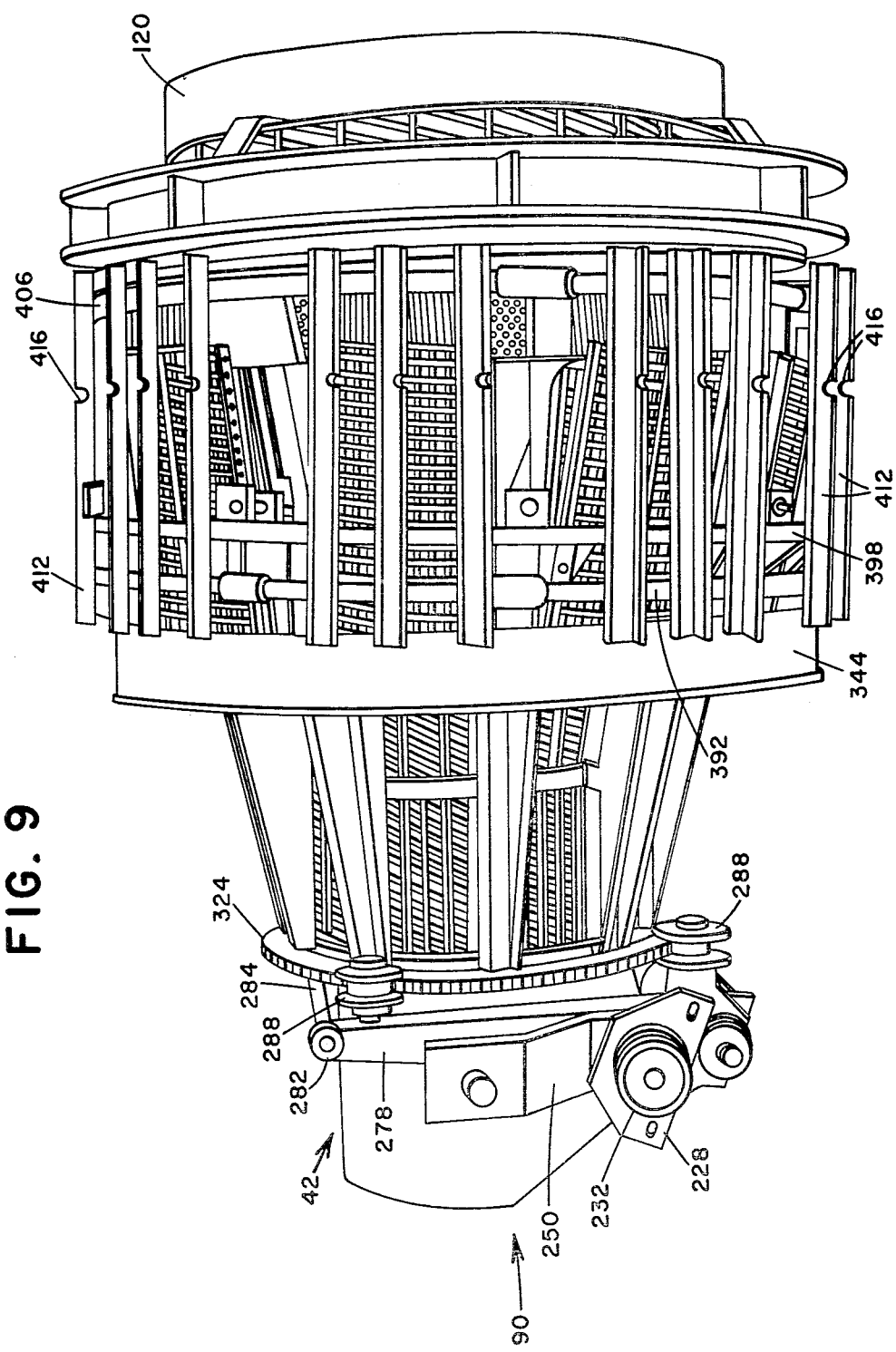
FIG. 9 is a left side perspective view of the rotary separator with grain pans, cleaner housing, fan and fan housing removed.

Referring now particularly to FIGS. 7, 8 and 9, left and right hand rocker arm support brackets, 228 and 230, are supported rigidly by frame members (not shown) of the combine body 10 adjacent the left and right hand sides of the infeed 90 section of the separator. Mounted rigidly in the rocker arm support brackets 228 and 230 are left and right hand rocker arm pivot assemblies 232 and 234 respectively, the pivot axes lying in a common horizontal line transverse to the separator. A heavy rubber bushing 236, concentric with the pivot, is mounted and secured against rotation and axial motion in each pivot assembly. A short pivot shaft 238 is housed in each rubber bushing 236 and also secured against rotation therein. Both shafts 238 extend axially inwards and outwards from their respective bushings. On the left hand side a shaft retainer 240 attached rigidly to the outer end of the shaft 238 limits axial movement of the shaft inwards towards the separator. On the right hand side a wobble drive assembly 242 is rigidly attached to the pivot assembly and includes an input shaft 244 (see FIG. 8) extending forward parallel to the axis of the separator and carrying, towards its forward end somewhat ahead of the inlet end of the separator, a drive sprocket 246. The wobble drive assembly 242 also includes an output yoke 248 coaxial with the rocker arm pivot assemblies 232 and 234 and drivingly connected to the outward extension of the right hand pivot shaft 238. The nature of the wobble drive 242 is such that continuous rotation of the input shaft 244 is translated into a regular oscillatory rotation of the output yoke 248. A rocker arm 250 is rigidly attached to the inward extension of each pivot shaft 238. Each rocker arm 250 has a lower or drive portion 252 extending downwards and carrying at its lower extremity a rigidly attached shaft retainer 254 having an inwardly directed socket 256, the axes of the shaft retainer sockets being horizontal and lying in a common line passing beneath the thresing housing 102 of the separator. Each rocker arm 250 extends generally upwards (as viewed in side elevation) but is offset outwards and carries at its upper end a counterweight assembly 258.

A tubular carriage shaft 260 extends between the lower portions 252 of the rocker arms 250, its ends engaging the sockets 256 and being secured against rotation in them and retained by tie rod 261, which passes through the shaft 260, and nuts 262. Journaled on the shaft 260 are left and right hand carriage arm assemblies 264 and 266 respectively. Each assembly includes a tubular bearing portion 268 spaced from the shaft 260 by a pair of rubber bushings 270, one bushing being adjacent each end of each bearing tube 268 and being secured to the tubes and the shaft 260 so that there is no relative motion between the bushing and the shaft or between the bushing and the tube. A fixed lug 272 extends downwards from each bearing tube 268 and a tie bolt 274 extends through them, retained by nuts 276. Extending upwards from the outer end of each bearing tube 268 are opposite tapered left hand and right hand carriage arms, 278 and 280 respectively, adjacent but not touching the threshing housing 102 of the separator. The upper end of each carriage arm carries a horizontally and transversely aligned tie bolt guide or bushing 282 and passing through them is a tie bolt 284 secured by jam nuts 286. A helical compression spring 287 (FIG. 10) threaded onto the bolt 284 is contained between the nuts 286 and an internal shoulder of the right hand bushing 282. Each carriage arm assembly 264 and 266 carries a pair of guide follower elements or rollers 288 (shown in detail in FIG. 11); each roller has a deep peripheral groove 290 and is journaled on an axially extending stub shaft 292, rigidly attached to the carriage arm assemblies 264 and 266. On both left and right hand assemblies one stub shaft 292 is attached on the bearing tube 268 and one towards the upper end of the carriage arm 278 or 280 so that there is one pair of rollers substantially beneath the threshing section of the separator and another pair disposed towards the upper side of the separator, all four rollers 288 being aligned with their grooves in a common plane and together with the carriage arm assemblies 264 and 266 forming a yoke embracing the forward end of the grain pan and cleaner assembly 52.

A bearing bracket 294 (FIGS. 7 and 8) rigidly attached to the outer wall of the right hand carriage arm 280, somewhat above the center line of the separator, has mounted rigidly on it a bearing housing 296 with a bearing bore parallel to the longitudinal axis of the separator. A spur gear shaft 298 is journaled in this bearing and extends both forward and rearward from the bearing housing. A spur gear 300 is mounted on the rearward portion to turn with the shaft and disposed axially so that the plane of the gear teeth lies in the same plane as the grooves 290 of the guide rollers 288. A spur gear drive shaft 302, coaxial with the spur gear shaft 298 is mounted forward of the shaft 298 and is drivingly connected to it by a telescoping coupling 304, the exposed portion of the coupling being protected by a bellows-like boot 306. The spur gear drive shaft 302 extends forward of the infeed housing 94 and is journaled in a bearing 308 carried by a support bracket assembly 310 supported by the combine frame. A tailings auger drive sprocket 312 is mounted for rotation with the shaft 302 just rearward of the support bracket assembly 310 and in alignment with the driven sprocket 214 at the forward end of the tailings auger 56. A cleaner drive sprocket 314 is mounted for rotation with the spur gear drive shaft 302 ahead of the bearing 308 and in alignment with the wobble drive sprocket 246, carried on the wobble drive input shaft 244.

Figure 3:
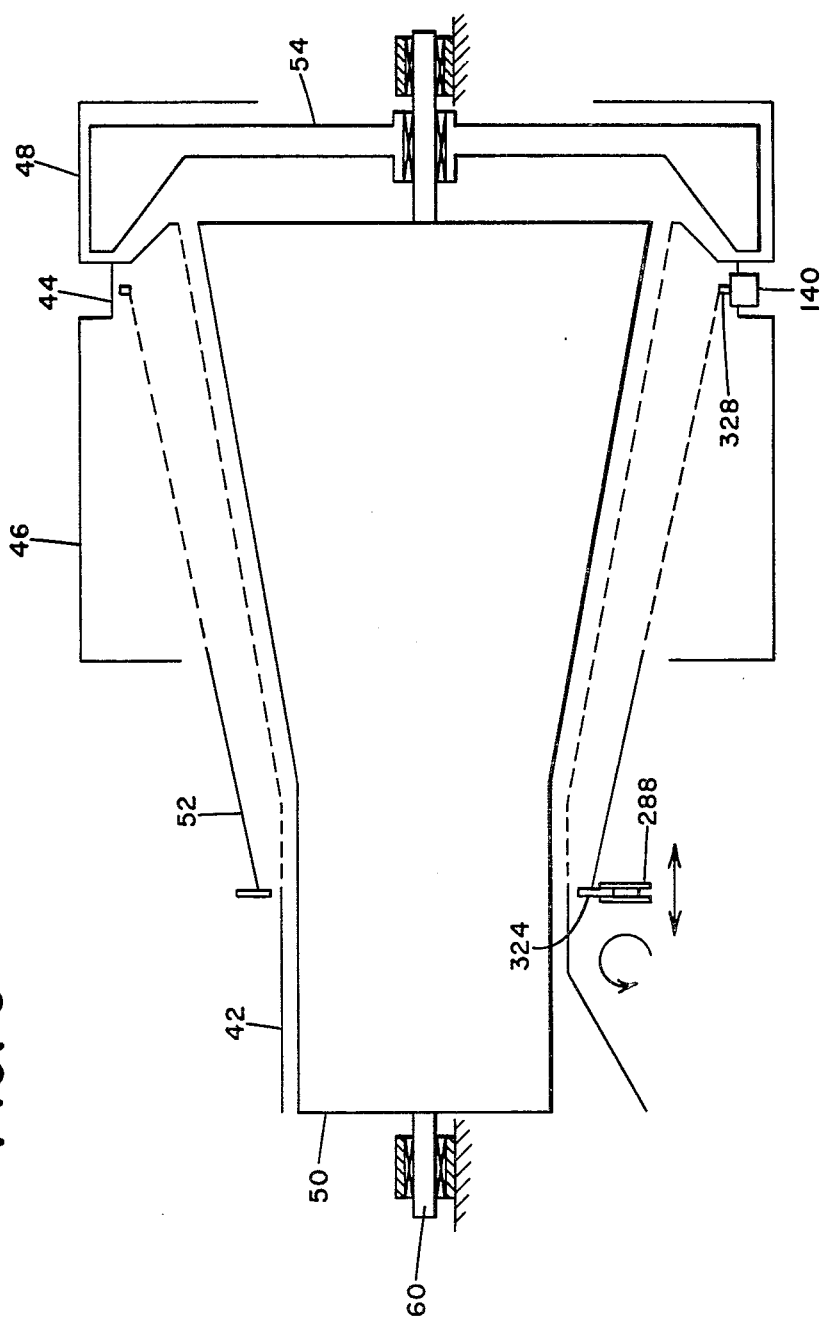
FIG. 3 is a simplified schematic left side view of the rotary separator.
Figure 4:
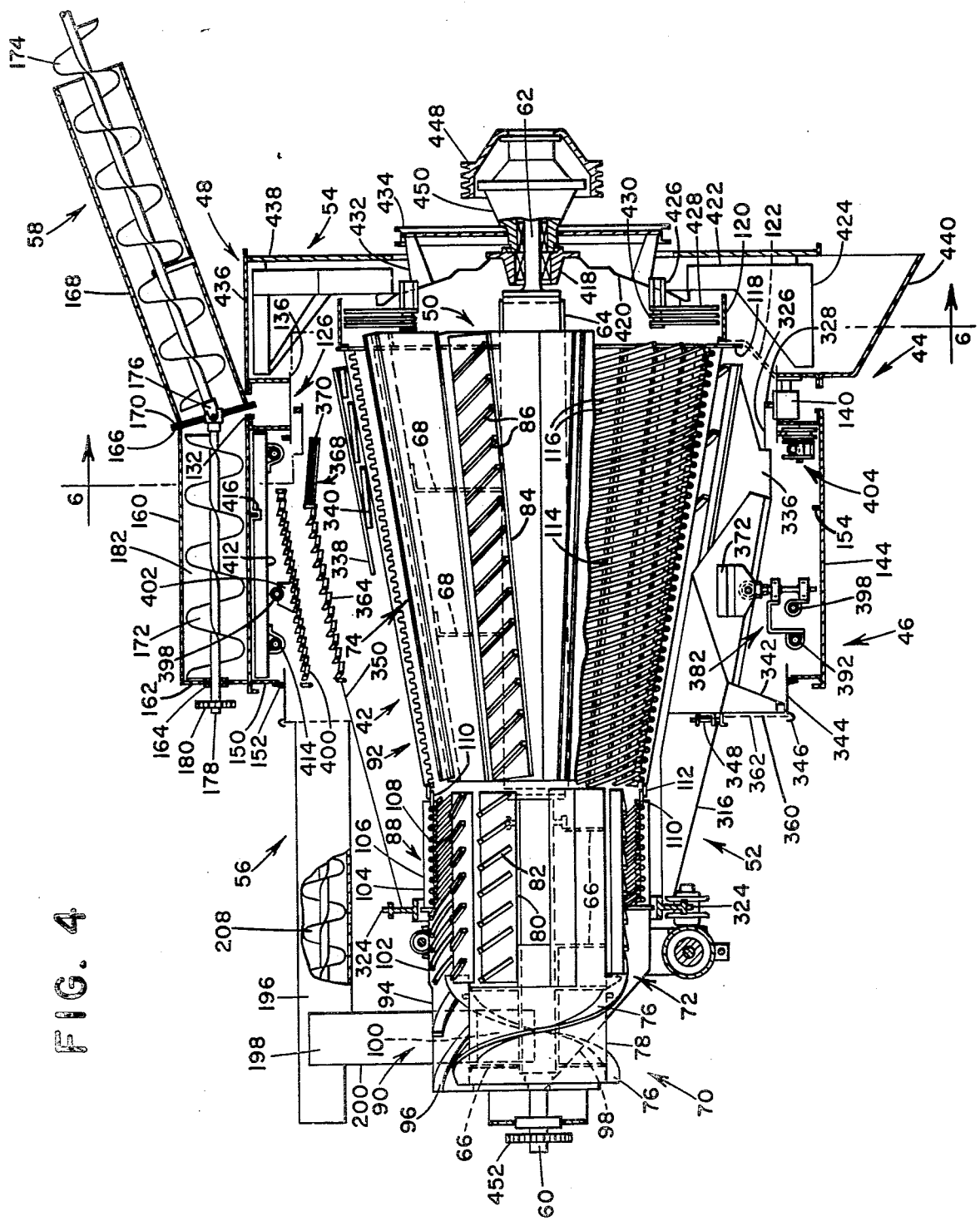
FIG. 4 is an enlarged more detailed semi-schematic left side elevation of the rotary separator variously cut away and sectioned.
Figure 11:
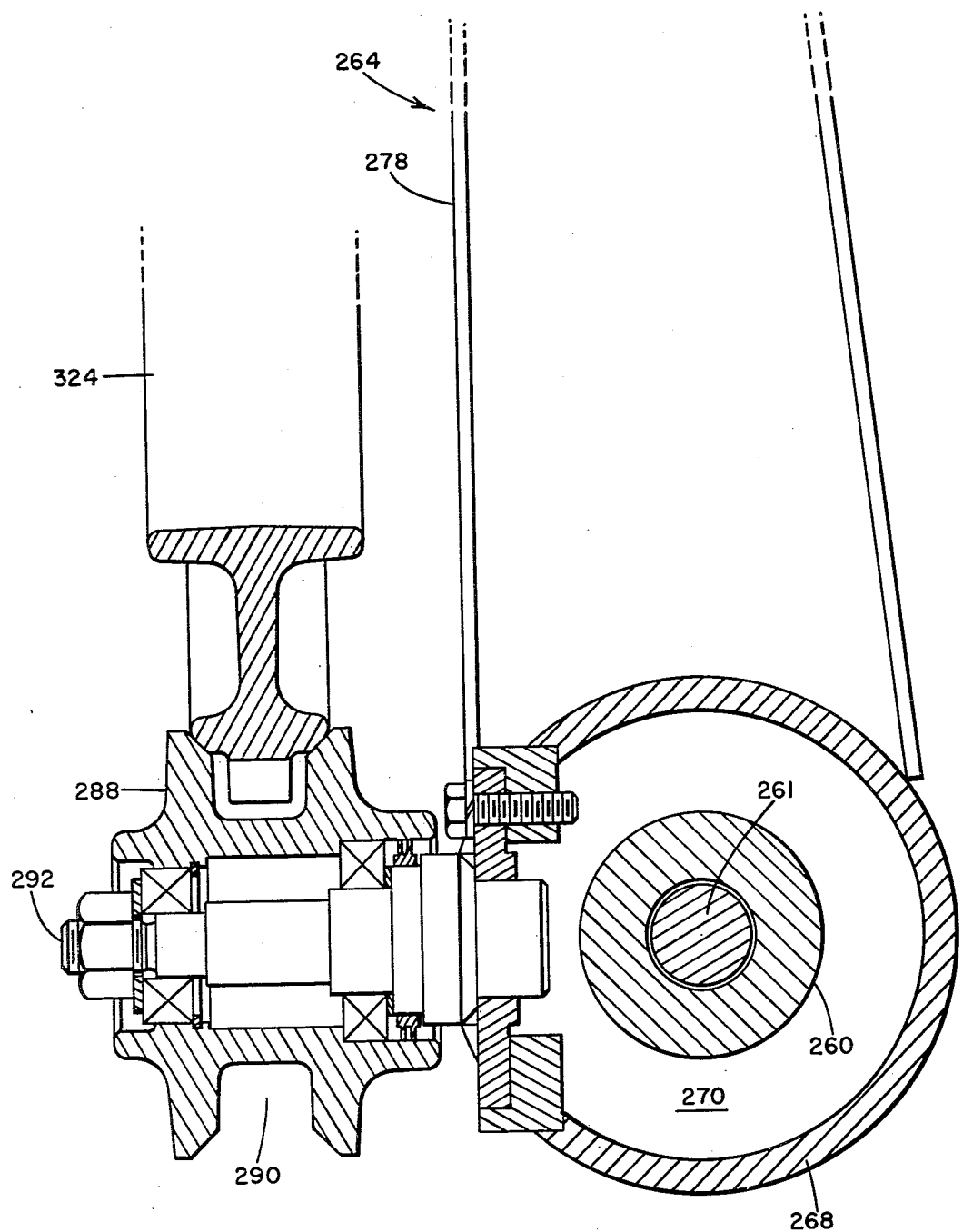
FIG. 11 is an enlarged partial sectional view on line 11—11 of FIG. 7 showing the ring gear and support rollers at the front of the cleaner.

Looking now at the grain pan and cleaner assembly 52 in more detail—as indicated in FIGS. 3 and 4 the assembly is generally frusto-conical in shape, extending axially from just forward of the middle of the threshing section 88 and surrounding and reaching nearly to the rearward or downstream end of the separator section 92 of the gate. Nine equally spaced axially extending cleaner ribs 316 are basic structural members in this assembly and extend over its full length. Each rib 316 has for most of its length a channel form cross section (FIGS. 12 and 13) with the open side of the channel facing radially outwards and including an inner wall 318, opposite side walls 320, and, extending circumferentially inwards from the outer end of both walls, rib flanges 322, each flange having an edge turned radially inwards. The ribs 316 are tapered, the dimensions of the channel form cross section increasing from front to rear. The forward ends of the ribs are rigidly attached around a ring gear 324 (which also constitutes a circumferential guide means for the grain pan and cleaner assembly 52), the ring gear being drivingly engaged by the spur gear 300 (see FIG. 8) and being supported and contained between the four guide rollers 288 so that it is concentric with the axis of the separator. As indicated in FIGS. 4 and 11, the ring gear 324 has the form of an annulus with a T cross section, the upright extending radially outwards and the cross piece directed inwards, fitting closely around the threshing section adjacent the junction between the threshing section wall 102 and the threshing grate 104.

Turning again to FIG. 5, an annular axially extending support flange 326, inset from the rearward ends of the cleaner ribs 316, is attached rigidly to the ribs, surrounding and connecting them. The rearward edge of the support flange 326 carries an external annular rib 328, the outer edge of which engages the two rollers 140 carried by the annular channel member 126 and is supported by them concentric with the axis of the separator, hence supporting the forward end of the grain pan and cleaner assembly 52.

Approximately the rear one-third of the inner wall 318 of each cleaner rib 316 consists of a sieve-like grid or foraminous portion 330. Forward and rear outward sloping funnel walls, 332 and 334 respectively, are contained between and cooperate with the side walls 320 of the cleaner rib 316 so as to form a collector funnel or grain diverter under the grid 330, the walls 332 and 334 converging on an outward directed funnel mouth or chaffer cover discharge opening 336, the discharge opening being approximately aligned axially with the tailings discharge channel 158 of the cleaner housing 46.

A sheet metal chaffer cover element 338 best seen in FIG. 4 is fitted between each cleaner rib 316 and extends axially from adjacent the rear end of the separator portion of the grate 92 to approximately its mid-point. The chaffer cover elements 338 are mounted so that their inner surfaces are at a slightly greater radius from the separator axis than the inner surfaces of the cleaner rib inner walls 318 and at a somewhat lesser radius than the cleaner rib grid 330 and a slight bend, approximately on the longitudinal center line of each chaffer cover element 338, ridges it outwards so that the inner surfaces of the chaffer cover elements taken together more nearly conform to a frusto-conical surface, constituting an "annular cover" and, with grids 330, an auxiliary separating element. Three approximately parallel and equally spaced material control ribs 340 are mounted on the inner surface of each chaffer cover 338 extending the full width of the cover, the direction of each material control rib approximating that of a left hand helix.

Each cleaner rib 316 carries a post 342 (shown clearly in FIG. 12) rigidly attached and extending radially outwards from it somewhat ahead of the sealing flange 150 of the cleaner housing 46. A short cylindrical sealing drum 344 concentric with the separator surrounds and is attached rigidly to the outer extremities of the radial posts 342. At its forward edge adjacent the forward face of the radial posts, the drum 344 has a small flange 346 turned radially inwards. The drum extends rearwards, slightly overlapping the sealing flange 150 and lightly engaging the seal 152. On the forward face of each radial post 342, partially within the channel opening of the cleaner rib 316, a spring loaded latch 348 is mounted.

A sheet metal grain pan element or tray 350 having leading and trailing tray portions 350a and 350b respectively, is fitted to the forward part of each bay between adjacent cleaner ribs 316 forming with these portions of the ribs a grain pan assembly. The pans extend from the ring gear 324 rearward to end at approximately the rearward edge of the radial support posts 342 and approximately in line with the forward edge of the cleaner housing 46. The grain pan elements 350 have flanges 352 along their longitudinal sides to mate with the flanges 322 of the cleaner ribs 316 to which they are secured by sheet metal screws 354, so that the cleaner rib walls 320 and the grain pan elements 350 together form the walls and bottoms respectively of a series of side by side grain or crop material collecting troughs. Each grain pan element 350 is ridged outwards slightly (the ridge 356 defining the tray portions 350a and 350b), partly so that the form of their inside surfaces taken together approximate more closely to a continuously curving frusto-conical surface. However, as can be seen in FIG. 12, the grain pan elements are ridged asymmetrically with the line of the ridge 356 diverging from a plane passing through the longitudinal axis of the separator and the grain pan element, in a counterclockwise direction as viewed from the front of the separator. Further, the tray portions taken as a whole are inclined or tilted towards the direction of rotation as is indicated in FIG. 13 which shows a typical cross section through a rib 316. The flanges 322 together may be said to define the basic frusto-conical envelope or surface of the grain pan trays and it can be seen that the trailing portion 350b diverges inwards from this frusto-conical envelope to lie at a reduced radius from the separator axis.

A low, radially extending sheet metal filler wall 358 is erected on the outer surface of each grain pan element 350 and extends between each adjacent support post 342 approximately in line with their forward surfaces. Each bay between adjacent cleaner ribs thus has an outer window or inlet 360 bounded by the corresponding support posts 342, the transverse filler wall 358, on its inner side and the sealing drum flange 346 on the outer side. Each of these inlets 360 is screened by a removable arcuate inlet screen element 362, the outer edge of the screen engaging the flange 346 of the sealing drum 344, the sides resting against the forward faces of the support posts 342 and the inner edge resting against the forward face of the transverse filler wall 358 and the screen being retained in position by the latches 348. The nine inlet screen elements 362 taken together thus constitute a nearly continuous annular screened opening or air inlet.

Between each cleaner rib 316, with its forward or upstream edge abutting the rearward or downstream edge of the grain pan element 350, is carried a relatively coarse adjustably foraminous or louvered sieve-like cleaner element known as a chaffer element 364 (see FIGS. 4 and 12). Their rearward edges are aligned axially approximately with the annular rib 154 of the cleaner housing 46, and each is riged (366) outwards to increase the conformity of the chaffer elements 364 taken together to a frusto-conical surface. In addition, as can be seen in FIG. 12, each chaffer element 364 taken as a whole is titled towards the direction of rotation. A finger bar assembly 368, attached to the rearward edge of each chaffer element 364, includes a series of axially rearwardly directed fingers 370, the finger bar assemblies 368 taken together lying approximately in a frusto-conical surface converging slightly towards the rear and overlying the tailings discharge channel 158 of the cleaner housing 46 so as to be interposed radially between the chaffer cover elements 338 and that channel and circumferentially between adjacent chaffer cover discharge openings 336.

Returning to FIG. 5, a slinger pivot bracket 372 is attached rigidly between the side walls 320 of each cleaner rib 316 immediately forward of the forward funnel wall 332. A slinger pivot arm 374 is pivoted transversely in the bracket 372 and extends radially outwards. Except at the pivot, the pivot arm is of circular cross section with an inner shoulder 376 adjacent the pivot and an outer end portion 378 of reduced diameter and an outer shoulder 380. Slipped onto each slinger pivot arm 374 is a slinger ring bracket assembly 382, each assembly including a first pivot block 384 adjacent the inner shoulder 376. Each pivot block includes a captive ball 386 having a bore matching the diameter of the slinger pivot arm 374 and free to rock with the pivot arm in the block. Attached rigidly to each pivot block 384 and extending first forwards and then outwards is a slinger ring bracket 388 having at its outer end a band 390, the nine such bands and brackets together holding a slinger ring 392 in welded assembly concentric with the separator axis. A second pivot block or bracket 394 similar to the first 384 and including a pivot ball 395 is slipped onto the reduced diameter outer portion 378 of the slinger pivot arm 374 with the pivot block adjacent the outer shoulder 380. Attached rigidly to the forward side of each second pivot block 394 is a clip 396, the nine clips 396 together being welded to and securing a sieve ring 398 concentric with the separator axis, slightly rearward of and slightly smaller in diameter than the slinger ring 392. When the pivot arms 374 extend radially outwards, perpendicular to the longitudinal axis of the separator, the pivot block balls, 386 and 395, abut the shoulders, 376 and 380 respectively, of each pivot arm so as to establish the concentricity of the slinger and sieve rings, 392 and 398 respectively.

Another cleaner element, an adjustably louvered foraminous sieve element 400 (see FIG. 4) is supported on a pair of spaced brackets 402 attached rigidly to the sieve ring 398 between each cleaner rib 316. A sieve element 400 is positioned directly radially outwards of each chaffer element 364, the sieve elements being slightly longer and slightly wider than the chaffer elements. As is indicated in FIG. 12, each sieve element 400 is also ridged longitudinally outwards and tilted towards the direction of rotation similar to the chaffer elements 364.

Towards the rear of the cleaner housing 46 is a roller ring assembly 404 (see FIG. 5) which includes a roller ring 406 of the same diameter and cross section as the slinger ring 392 and, attached rigidly to it, three equally spaced roller brackets 408, each having journaled and retained on it at its rearward side a roller 410 having a peripheral groove 411. The roller ring assembly 404 is assembled into the separator with the grooves 411 of the rollers 410 engaging the roller guide rib 138 of the annular channel member 126 so that the roller ring assembly is free only to rotate in a plane perpendicular to the axis of the separator. Circumferentially adjacent each slinger pivot arm 374, an axially extending slinger paddle or impeller 412 of a stiff material such as steel is secured rigidly by clamps 414 to the outside of the slinger and roller rings, 382 and 406 respectively, thus establishing the axial spacing of the rings. Each paddle 412 extends almost the full length of the cleaner housing 46 and narrowly clears the inside of its outer wall 144. A notch 416 in the outside edge of the paddle 412 provides clearance for the cleaner housing divider rib 154.

The centrifugal fan or blower assembly 54 (FIGS. 4 and 6) includes a hub assembly 418 by which it is journaled on the rotor rear shaft 62 immediately adjacent the rear of the separator. A fan center disk 420 is piloted concentrically on and attached rigidly to the hub assembly 418 and carries a concentric fan wheel assembly 422 including fan blade elements 424. A series of inner discharge hammer assemblies 426 are carried by the fan center disk 420 within the inner discharge housing 120, each hammer assembly including three discharge hammers 428 extending radially and free to swing on pivot arms 430. A series of rearwardly and axially extending fan drive sheave brackets 432 are mounted on the rear side of the fan center disk 420 and carry a V belt driven sheave 434 concentric with the separator axis. The generally cylindrical fan housing 48 includes a perforated casing 436 of about the same diameter of the cleaner housing 46, wrapped around and secured to the rear outer flange 132 of the annular channel member 126 and extending rearward a distance slightly greater than the width of the fan blades 424. The fan wheel assembly 422 is partially enclosed on its rearward side by an annular fan shield 438, attached rigidly to a flanged rear edge of the fan casing 436. The lower right hand quadrant of the fan casing is open to communicate with a downward directed sheet metal discharge chute 440.

Power for the separator and clean grain and tailings augers is taken from the engine crank shaft 442 (FIG. 1) through V belt drives 444 and 446 to the fan sheave 434 and a rotor drive sheave 448 respectively. The rotor drive sheave 448 (FIG. 4) is coaxial with the rotor 50 and is carried on and coaxial with a planetary drive assembly 450 which is supported rigidly from a transverse member of the combine body 10 by a support bracket (not shown). The rotor rear shaft 62 is journaled in and driven by the planetary drive assembly 450. The rotor front shaft 60 is journaled in a bearing bracket (not shown) supported rigidly by a frame member of the combine body 10.

Referring to FIGS. 7 and 8, a sprocket 452 carried on a splined portion of the rotor front shaft 60 transmits power through a roller chain 454 to sprockets 246 and 314 and hence to the wobble drive input shaft 244 and spur gear drive shaft 302 respectively. A sprocket idler, 455, mounted above the spur gear drive shaft 302 is employed, permitting the chain 454 to be trained around sprocket 314 so that spur gear shaft 302 rotates in the desired direction. The tailings auger 56 is driven through the sprocket 214 on the tailings auger front shaft 210 by a roller chain 456 from the sprocket 312 carried on the spur gear drive shaft 302. Power is transmitted to the sprocket 180 to drive the clean grain loading auger 58 from the tailings auger rear sprocket 216 by means of a jack shaft 458 and chain and sprocket drives 460 and 462.

Considering the drive system in more detail and with particular reference to the relative motion between the various components of the separator or crop processing unit 28, the rotor 50 is driven directly through the planetary unit 450 in a counterclockwise direction viewed from the front and in a fixed axial relationship to the stationary grate and inlet housing assembly 42.

A single roller chain 454 drives the input sprockets 314 and 246 of the rotary and the reciprocating drives respectively of the grain pan and cleaner assembly 52 but they are essentially independent drives. For example, the size of sprocket 314 may be changed to change the speed of rotation, without affecting the reciprocating motion. Similarly, the size of sprocket 246 may be changed to change the frequency of the reciprocating motion of the wobble drive assembly 242 without affecting the rotary motion. If it was desired to have the option of relying only on rotary motion in the cleaner, a throw-out clutch could readily be placed in the drive train to the reciprocating mechanism without affecting the rotational drive.

As indicated above, the forward end of the grain pan and cleaner assembly 52 is supported and positioned radially and the assembly as a whole is positioned axially by the rollers 288 carried on the carriage arm assemblies 264 and 266 and engaging the ring gear 324. During assembly, the grain pan and cleaner assembly 52 is adjusted to be concentric with the fixed grate and inlet housing assembly 42 and bearing pressure or preload between the grooves 290 of the rollers 288 and the flanges of ring gear 324 is established (see FIG. 11) by changing the relative radial positions of the rollers 288, manipulating the upper and lower tie bolts 284 and 274 respectively, as required and relying in part on the resilience of the spring 287 on the upper tie bolt 284. The resilience of the rubber bushings 236 and 270 in the rocker arm pivots 232 and 234 and in the carriage arm assemblies 264 and 266 respectively, is sufficient to tolerate any minor misalignment of the carriage arm assemblies that may result from this adjustment. The rear end of the grain pan and cleaner assembly 52 is supported and positioned radially by the rolling engagement of the annular rib 328 on the smooth rollers 140 of the circular mounting assembly 44. The grain pan and cleaner assembly 52 rotates in the same direction as the rotor 50, that is counterclockwise as viewed from the front.

The grain pan and cleaner assembly 52 is reciprocated axially through the wobble drive 242 and rocker arms 250. As indicated above, the grooves 290 of the rollers 288 engage the ring gear 324 so that the grain pan and cleaner assembly 52 is positioned by and moves axially with the carriage arm assemblies 264 and 266, which carry the rollers 288 and are connected to the rocker arms 250. As can be seen from FIG. 11, the mating surfaces of the grooves 290 and the ring gear 324 are chamfered in such a way that when radial pressure is established between them (as described above) their axial relationship is effectively fixed so that axial reciprocation can take place without lost motion or chattering between the gear 324 and rollers 288. At the rear, the smooth rollers 140 of the circular mounting assembly 44 are of width sufficient to accommodate the axial displacement of the annular rib 328 and the rib slides axially as well as rolling on the rollers 140.

The reciprocating rotary motion imparted to the rocker arms 250 by the wobble drive 242 results in the rocker arm shaft retainers 254 at the lower end of the rocker arm lower portions 252 moving in a small arc close to bottom dead center, and the geometry of the assembly is such that the motion imparted to the carriage arm assemblies 264 and 266 (which it will be noted are maintained perpendicular to the axis of the separator through engagement of the rollers 288 with the ring gear 324) and hence to the forward end of the grain pan and cleaner assembly is axial with only a small vertical component. The construction of the rocker arm shaft retainers 254 and the mating ends of the rocker arm cross shaft 260 is such that there is a rigid torsional connection between the left and right hand rocker arms 250 so that the axial forces required to reciprocate the cleaner assembly 52 are shared nearly equally between left and right hand carriage arms 278 and 280 and their respective guide rollers 288.

The wobble drive 242 is variable by fitting drive shafts (not shown) of differing eccentricity so that a range of axial throws of the grain pan and chaffer assembly 52 is selectively available. The rubber bushings, 236 in the rocker arm pivots 232 and 270 in the carriage arm assemblies 264 and 266, act as torsion springs, alternately storing and releasing energy as the parts engaging them, driven by the wobble drive, pivot relative one to another so that, with inertia balancing assistance from the counterweights 258, the reciprocating grain pan and cleaner assembly 52 is driven efficiently and with a minimum of vibration. The upper rollers 288 exert a driving force nearly equal to the lower rollers 288, due to the inertial effect of the carriage arm assemblies 264 and 266 resisting the torsional windup of the bushings 270.

The sliding coupling 304 between the spur gear shaft 298 and the spur gear drive shaft 302 accommodates the relative axial motion between these two shafts when the grain pan and cleaner assembly reciprocates.

The grain pan 350, chaffer 364 and chaffer cover 338 elements are structurally united with the cleaner ribs 316 and hence reciprocate together but the sieve elements 400 are given an opposing reciprocating motion—that is to say there is a phase difference between their respective reciprocations. Axial motion is transmitted from the ribs 316 to the sieve elements 400 through the interaction of the pivot arms 374 transversely pivoted to each rib (see FIG. 5), the first or intermediate pivot block assemblies 384 threaded onto the pivot arms 374 being restrained axially and the second or outer pivot block assemblies 394 threaded onto the outer portions 378 of the pivot arms, the latter being in a fixed relationship to the sieve elements 400 through the sieve ring 398 and brackets 402 (FIG. 4). The slinger paddles 412 are in effect driven by the slinger pivot arms 374 through the slinger ring bracket assembly 382 to which they are connected by the slinger ring 392. The rearward roller ring 406 being rigidly connected to the slinger ring 392 through the paddles 412 is thus driven to rotate with the grain pan and cleaner assembly 52. However, the peripheral grooves 411 of the rollers 410 carried by the roller ring 406 continuously engage the fixed guide rib 138 attached to the fixed circular mounting assembly 44, thus causing the rollers and hence all parts rigidly connected to the roller ring 406, including the first or intermediate pivot block assembly 384 (part of bracket assembly 382), to be constrained to move only in a circular path in a plane perpendicular to the axis of the separator. The first pivot block 384 is thus fixed (relative to reciprocation) and so the reciprocating motion of the sieve elements 400 driven by the outer ends 378 of the pivot arms 374 is opposed to that of the chaffer elements 364 which move in unison with the inner ends of the slinger pivot arms 374.

In operation, the combine moves over a field and crop material is gathered and fed rearwardly and upwardly to the separator unit through the opening 98 in the infeed housing wall 94. There the helical flighting 76 of the infeed portion 70 of the rotor engages the material and, with the cooperation of the helical elements 96 on the fixed infeed housing wall 94, it is accelerated axially and distributed circumferentially and fed to the threshing section. The helically arranged moving material control elements 82 of the rotor threshing bars 80 cooperate with the stationary spiral rod threshing grate 104 to thresh most of the grain from the material while maintaining a spirally rearward movement of the mass of the material in the annular space between the rotor and the grate. Threshed grain with some chaff and other trash is expelled by the rotor, centrifugally outwards through the spiral rods 108 of the threshing portion of the grate, to be collected on or intercepted mostly by the grain pan elements 350 although a small amount of material may be retained on the inner surface of the inner wall 318 of the cleaner ribs. The grain pan and cleaner assembly 52 is rotated at such a speed that the grain, chaff and trash are retained against the inner surfaces of the grain pan elements but, because of the combined effects of the reciprocating motion and a centrifugal effect deriving from the diverging approximately frusto-conical surface, the material is also propelled rearwards for delivery to the chaffer elements 364.

As has been described above, the crop material intercepting elements (grain pan 350, chaffer 364 and sieve 400) of the grain pan and cleaner assembly are tilted towards the direction of rotation and, in addition, the grain pan elements 350 are ridged asymmetrically. Such a configuration helps maintain even distribution of crop material on the cleaner elements for more efficient separation performance, at least partially offsetting the particular effect of acceleration forces on a particle of crop material in motion on a frusto-conical surface. A particle moving generally axially in the direction of increasing cone diameter in a cone rotating at constant rotational speed is moving from a slower to a faster moving surface (velocity of an element of the surface is a function of diameter and rotational speed). Following the well known laws of physics, the inertia of such a particle causes it to tend to "lag behind", moving not linearly but, relative to the conical surface, in a curved path against the direction of rotation. In the case of the grain pan elements 350, use of an unmodified frusto-conical form would cause crop material moving rearward over them to be diverted relatively clockwise tending to concentrate the material against a rib wall 329 on the trailing side of the pan. The tilted and particularly ridged form used here minimizes such relative movement and helps deliver material evenly across the width of the downstream edge of the grain pan element 350 onto the chaffer element 364. The ridged and tilted configuration of the chaffer and sieve elements 364 and 400, described above and shown in FIG. 12, works in a similar way to maintain evenness of distribution of material moving over them.

The crop material, mostly straw, remaining in the annular threshing space is delivered to the frusto-conical annular separating space between the separating grate 92 and the rotor separating portion 74 where the helically arranged material control elements 86 of the rotor separator 84 cooperate with the stationary separator grate 92 to agitate the crop material so that most of the remaining grain and unthreshed heads are expelled centrifugally by the rotor through the grate while propelling the mass of material spirally rearwards. The centrifugal effect of the diverging frusto-conical separator section assists the helical forms of the separator components in moving the material rearwards. As can be seen, from FIG. 4, for example, the grain and other relatively small material expelled centrifugally from approximately the first half of the separator section will be intercepted by either the grain pan elements 350, for delivery to the chaffer elements 364, or by the chaffer elements themselves.

It is clear from the drawings (FIG. 4 for example) that if the centrifugal forces generated by rotation are thought of as gravitational forces, then the general arrangement of any single set of the frusto-conically arranged grain pan 350, chaffer 364 and sieve 400 elements is very similar to that of a reciprocating shoe or cleaner in a conventional combine. Grain to be cleaned is delivered from the grain pan onto the chaffer and propelled over its surface by a combination of "gravitational" (because of downward inclination) and inertial forces while clean grain and other smaller particles pass "downwards" through it onto a sieve, the whole cleaner meanwhile being exposed to a blast of cleaning air flowing generally rearward but slightly upward through the shoe elements. In the present invention, however, the clean air is drawn through the shoe by the downstream fan assembly 54, entering through the air inlets 360, whereas in conventional combines the cleaning fan is usually placed ahead and slightly below the cleaning shoe and air is blown, rather than drawn, rearwards and upwards.

Returning to the present invention, final cleaning of the grain is done by the sieve elements 400 and clean grain is expelled centrifugally outwards into the clean grain channel 156 of the stationary cleaner or collecting housing 46 where it is carried circumferentially by the paddles 412 to the clean grain discharge housing 146 where it leaves the cleaner housing centrifugally and tangentially and passes through the receiving opening 182 into the receiving section of the clean grain auger 58 for delivery rearwards and upwards into the grain tank 18.

Material too large to pass through the chaffer 364 or the sieve 400 elements and not light enough to be carried away by the cleaning air for discharge by the fan, passes over the rear edges of the chaffer 364 and sieve 400 elements and is delivered centrifugally into the tailings return channel 158 of the cleaner housing 46. The finger bar assembly 368 which forms an extension of the chaffer element 364 performs an additional separating function, diverting larger pieces of trash and longer straw to the fan housing while unthreshed heads and any other smaller particles pass through to be intercepted by the tailings return channel 158.

The chaffer cover elements 338, and the rearward portions of the inner walls 318 of the cleaner ribs 316 part of which are interrupted by the grids 330 of the rib return, form together a generally frusto-conical surface which intercepts material passing outwards through the spiral rods of approximately the rearward half of the separating grate 92. In addition, any small amount of material remaining on the inner surface of the inner wall 318 of the cleaner ribs enters the chaffer cover zone and moves either directly to the grid 330 area or onto one of the chaffer cover elements 338. The material control ribs 340 on the inside surface of the chaffer cover elements are arranged so that they retard the rearward flow of material intercepted by those elements diverting it so that remaining grain and unthreshed heads can pass through the rib return grid 330. Material passing through the rib return grid 330 passes centrifugally outwards through the rib return funnel opening 336 to be intercepted by the tailings channel 158 and carried around the housing along with other tailings by the paddles 412 to be discharged centrifugally and tangentially at the tailings discharge housing 148, through the receiving opening 218 into the tailings discharge auger 56. (It can be seen that with a minor change in relative disposition of the cleaner elements 364 and 400, and the chaffer cover elements 338, material from the rib return grid 330 could be delivered to the chaffer.) The tailings auger 56 conveys material forward to the front of the separator unit where it passes down through the tailings delivery chute 198 into the infeed zone of the separator for recycling.

A major portion of the straw and other trash discharged rearwardly from the frusto-conical annulus between the rotor and the separator grate enters the inner discharge housing 120 where it is engaged by the inner discharge hammers 428. Because of the opening 121 in the housing 120 some of the material is able to pass directly into the fan housing to be engaged by the fan wheel 422. It is often preferred that the speed of rotation of the fan wheel 422 be higher than that of the rotor 50 and in that case the effect of the inner discharge hammers 428, which are carried by the fan center disk 420, will be to accelerate material received at approximately rotor speed from inside the separator grate so that when it is released through the inner discharge housing opening 121 into the fan housing it will have a tangential component of velocity approaching that of the nearby inner portion of the fan blades 424. The result is lower impact forces on the fan blades and longer fan blade life and a reduced power requirement. Material delivered rearwards by the chaffer cover 338 and by the finger bar extension 368 of the chaffer, plus material drawn rearward by the cleaning air as it passes through the centrifugally directed flow of material moving radially outwards between cleaner elements 364 and 400, enters the fan housing 48 rearwardly and axially, encountering the fan blades and being carried around to be discharged along with the straw centrifugally downwards from the housing through the discharge chute 440.

The principal air moving duty of the fan is drawing cleaning air through the rotationally moving air inlets 360 for generally axial movement through the cleaner and chaffer cover areas. Once the cleaning air has completed its job of delivering material rearwards into the fan housing it may be released. The fan casing 436 is therefore perforated so that, including the discharge chute 440 portion, air is discharged centrifugally over 360° of circumference. This reduces the power required to drive the fan, increases fan and cleaning efficiency, and promotes uniformity of airflow around the separator in that both the air inlet and outlet passages span substantially 360°.

As has been indicated above, the rotating elements of the separator are driven at such speeds that centrifugal force is effective (a) to transfer or expel material radially outwards through the several stages of separating and cleaning, (b) to hold material against the full 360° of internal surfaces, particularly those of the elements of the grain pan and cleaner assembly, while separating and conveying occurs, and (c) in conjunction with the use of generally frusto-conical forms, to effect axial movement of crop material. Rotational speeds for acceptable specific performance, in terms of separating capacity and efficiency and power consumption for example, depend on variables such as crop type and condition and diameter of separator. For example, a separator having the following approximate dimensions: rotor-major and minor diameters 40 and 20 inches respectively, grain pan elements—minor diameter 31 inches, chaffer elements—minor diameter 45 inches and fan outside diameter 65 inches, the following speeds have given acceptable results: rotor—300 to 900 rpm with a preferred speed of 315 rpm, grain pan and cleaner assembly—58 to 65 rpm with a preferred speed of 60 rpm and fan—350 to 550 rpm with a preferred speed of 550 rpm. Throws of 1⅛ to 1¾ inches of the axially reciprocating grain pan and cleaner assembly gave good results with 1⅜ inches being preferred. Frequency of reciprocation ranged from 220 to 320 cycles/minute with 288 being preferred. In general speeds in excess of those required to hold material comfortably against the inner surfaces of the rotating elements produce unnecessarily high centrifugal forces which must be offset by relatively higher air flows (and hence higher power consumption).

We claim:

1. An axial flow rotary combine comprising:

a mobile frame;

a rotary separator unit mounted on the frame and having a generally fore-and-aft rotor, a grate surrounding the rotor and having generally radial openings substantially around the periphery of the grate, a forward inlet and a rearward outlet between the grate and the rotor;

a forward mounted header, carried by the frame, for removing crop material from a field and delivering it through the inlet;

means carried by the frame for rotating the rotor so that it engages the crop material moving through the inlet and propels the crop material in a rearward spiral between the rotor and grate, whereby a portion of the crop material is separated and moves radially through the grate openings while the remainder is moved through the outlet;

an annular, rotary cleaner coaxially supported and surrounding the separator forwardly of the separator outlet for receiving crop material moving generally radially outwards through at least a portion of the grate openings and including radially extending openings for passing at least a portion of the crop material received from the separator and a rearward outlet;

means carried by the frame for rotating the cleaner;

a blower having an inlet communicating with the cleaner outlet and operative to move air through the crop material moving outwards from the grate to entrain a low density portion of said material and carry it through the cleaner outlet;

a grain receptacle mounted on the frame; and clean grain handling means carried by the frame for intercepting and collecting the material moving through the cleaner openings and delivering it to the grain receptacle.

2. The invention described in claim 1 wherein the grain receptacle includes an elevated central portion above the separator and a pair of depending saddle portions on opposite sides of the separator, and the clean grain handling means including an annular housing surrounding the cleaner for receiving grain passing outwards through the cleaner and an upward discharge opening, impeller means for engaging the material and propelling it circumferentially around the housing and through the discharge opening, and means for conveying the crop from the discharge opening to the grain receptacle.

3. The invention described in claim 1 wherein the blower includes a fan wheel disposed at the rear of and coaxial with the separator rotor, and the cleaner includes an annular air inlet coaxial with and forwardly of the cleaner, and means for rotating the fan wheel so that it draws air through the inlet and through the cleaner.

4. The invention described in claim 1 wherein the cleaner includes a tailings section disposed at the rearward end of the cleaner and having an outlet and including tailings handling means for intercepting and collecting the material moving through the outlet of said tailings section and delivering it to a forward position of the separator.

5. The invention described in claim 4 and including an annular cover surrounding the rearward end of the grate between the grate and the cleaner and operative to intercept crop material moving through the grate openings adjacent the rearward end thereof and means for delivering at least a portion of the material collected by the cover to the tailings handling means.

6. The invention described in claim 1 and further including means for reciprocating the cleaner axially.

7. An axial flow rotary combine comprising:
a mobile main frame;
a housing mounted on the frame having a forward cylindrical threshing portion with a crop inlet and a frusto-conical separating portion coaxially diverging rearwardly from the threshing portion and including generally radial openings substantially around the entire separating portion and a rearward outlet;
a forward mounted header, carried by the frame for removing crop material from the field and delivering it through the inlet;
a rotor mounted for rotation in the housing and including a forward infeed portion adapted to engage crop material moving through the inlet and move it rearwardly between the rotor and the housing, a generally cylindrical threshing portion disposed within the threshing portion of the housing and having threshing members adapted to engage the crop material delivered by the infeed portion and move it rearwardly, and a frusto-conical separating portion coaxially diverging rearwardly from the threshing portion and operative to engage crop material delivered by the threshing portion to impel a portion of the material through the openings in the housing and the remainder through the outlet; and
means for rotating the rotor.

8. The invention described in claim 7 and including an annular cleaner coaxially mounted around the separating portion of the housing forwardly of the outlet and adapted to receive at least a portion of the crop material moving through the housing openings.

9. An axial flow rotary combine for harvesting and processing crop material comprising:
a mobile main frame;
a rotor supported by the frame having an approximately horizontal axis of rotation and an external surface including material control elements for propelling and agitating the crop material;
a grate having an at least partially foraminous wall supported by the frame and surrounding the rotor so as to create a first annular space between the rotor and grate, said space having opposite inlet and discharge ends, the wall having an internal surface including material control elements for propelling and agitating the crop material;
means carried by the frame for gathering crop material from a field and delivering it to the first annular space adjacent the inlet end;
means for rotating the rotor, whence the material control elements of the rotor cooperate with the material control elements of the grate to engage the crop material delivered to the first annular space and propel it towards and discharge end while agitating it so that a portion of the crop material including smaller particles is expelled centrifugally through the foraminous wall and the remainder of the crop material is retained in the first annular space and discharged at the discharge end;
a collecting housing supported by the frame, surrounding a portion of the grate towards the discharge end, said housing having a generally cylindrical outer wall and including a first outlet;
first means for intercepting a portion of the crop material expelled through the grate and directing it towards the first outlet, said means including a first rotary intercepting element supported by the frame and surrounding the grate so as to create a second annular space and said intercepting element having inner surfaces and terminating adjacent the first outlet of the housing; and
means for rotating the first intercepting element at such a speed that the crop material intercepted by it is held against the inner surfaces by centrifugal force.

10. The invention defined in claim 9 wherein the rotor includes a generally cylindrical portion adjacent the inlet end and a coaxial frusto-conical portion extending and diverging from the cylindrical portion towards the discharge end.

11. The invention defined in claim 9 wherein the collecting housing includes a second outlet disposed between the first outlet and the discharge end and further comprising:
a generally annular rotary grain cleaning means, surrounding the grate and including an at least partially foraminous sieve element, disposed between the inlet and discharge ends so as to receive and separate crop material from the first intercepting element, a first portion of the crop material passing generally radially through the sieve element for delivery to the first outlet and a second portion being retained on and moving axially over the sieve element for delivery to the second outlet.

12. The invention defined in claim 11 and further comprising an annular cover having an at least partially foraminous wall and surrounding a portion of the grate between the discharge end and the grain cleaning means and axially partially overlapping said grain cleaning means and disposed radially between the grate and said grain cleaning means.

13. The invention defined in claim 11 and further comprising a conveyor connected between the second outlet and the first annular space for receiving crop material from the second outlet and delivering it to the first annular space adjacent the inlet end.

14. The invention defined in claim 11 and further comprising:
a fan assembly supported by the frame including a fan wheel coaxial with the rotor and a fan housing having an inlet side including an inlet communicating with the annular spaces; and
wherein the first intercepting element includes, adjacent the first outlet, an annular air inlet communicating with the annular spaces and the fan assembly is disposed adjacent the discharge end so as to draw air through the annular inlet and thence through at least a portion of the annular spaces with additional separating effect on crop material expelled centrifugally from the grate and annular cover.

15. The invention defined in claim 14 wherein the fan assembly is of the centrifugal type and the fan housing includes a generally cylindrical housing wall interrupted by a discharge opening and disposed to receive material from the annular spaces through the inlet and discharge it centrifugally through the discharge opening.

16. The invention defined in claim 15 wherein a generally cylindrical inner discharge housing approximately concentric with the grate and smaller in diameter than the fan wheel is disposed at the discharge end to conduct crop material discharged from the first annular space into the fan housing and wherein the fan wheel carries a plurality of air moving blades extending towards the wheel periphery and a plurality of material impelling elements extending into the inner discharge housing for engaging discharged crop material and accelerating it circumferentially for reception by the fan wheel blades after it passes through the inner discharge housing.

17. The invention defined in claim 15 wherein the fan housing wall is perforated for spilling radially a portion of the air moved by the fan.

18. The invention defined in claim 9 wherein the housing includes a second outlet disposed between the first outlet and the discharge end and further comprising:
- an annular cover, having an at least partially foraminous wall surrounding a portion of the grate towards the discharge end so as to create a third annular space, supported for rotation about the grate, and having an internal surface including material control elements and disposed to intercept a portion of the material expelled through the foraminous wall of the grate;
- means for rotating the annular cover so that a separation of the crop material intercepted by it takes place, said separation being at least partly controlled by the material control elements and a separated portion of the crop material, including finer particles, being expelled centrifugally through the foraminous wall of the annular cover while the remainder is retained in the third annular space for movement towards the discharge end; and
- means disposed around and radially outside of the annular cover for intercepting the portion of the crop material expelled through the cover and directing it towards the second outlet.

19. The invention defined in claim 18 and further comprising rotary grain cleaning means within the collecting housing, surrounding the grate and external to and partially longitudinally overlapping the annular cover and disposed to receive crop material delivered by the first intercepting means and at least a portion of the crop material discharged centrifugally by the annular cover.

20. The invention defined in claim 19 wherein the rotor and grate are generally frusto-conical in form.

21. The invention defined in claim 18 and further comprising first and second auger conveyors carried by the frame having axes approximately parallel to the rotor axis, disposed adjacent the cylindrical outer wall of the collecting housing and including conveyor housings having receiving openings; and
- wherein the first and second outlets are disposed towards the top of the collecting housing and are in a crop delivery relationship with said conveyor housing receiving openings.

22. The invention defined in claim 21 and further comprising a grain tank carried by the frame and wherein the first auger conveyor delivers crop material to said grain tank.

23. The invention defined in claim 21 wherein the second auger conveyor delivers crop material to the first annular space adjacent the inlet end.

24. The invention defined in claim 21 wherein the cylindrical wall of the collecting housing includes circumferentially and internally disposed first and second annular crop material conveying channels for conducting crop material to the first and second outlets respectively and wherein the respective widths of the channels, housing outlets and receiving openings of the auger conveyors are substantially equal so that crop material is conveyed from the channels through the outlets and into the auger conveyors substantially without energy loss due to change of direction.

25. An axial flow rotary combine for harvesting and separating crop material comprising:
- a mobile main frame;
- a separator rotor supported by the frame and having an approximately fore-and-aft and horizontal axis of rotation and forward inlet and rearward discharge ends;
- a separator grate supported by the frame and surrounding the rotor;
- a generally annular rotary grain cleaner including a foraminous separating element surrounding the grate between the inlet and discharge ends and supported by the frame for rotary motion about the grate;
- means for rotating the cleaner about the grate;
- means carried by the frame for gathering crop material from a field and delivering it to be engaged by the rotor adjacent the inlet end;
- drive means for rotating the rotor and propelling the crop material from the inlet end between the rotor and grate towards the discharge end whereby a separated portion of the crop material is expelled radially through the grate by the rotor, at least a first fraction of said portion being intercepted by the cleaner separating element and a part of the first fraction passing radially through the cleaner separating element; and
- a cleaner housing supported by the frame having an outer wall and surrounding the cleaner for receiving crop material from the cleaner element.

26. The invention defined in claim 25 and including a blower supported by the frame, said blower including a fan wheel coaxial with the rotor adjacent the discharge end of the rotor, and the blower housing having an air inlet communicating with the cleaner housing.

27. The invention defined in claim 25 wherein the rotor and grate each include axially corresponding forward cylindrical and rearward rearwardly diverging frusto-conical portions and the cleaner separating element is generally frusto-conical in form and is disposed substantially around the frusto-conical portion of the grate.

28. The invention defined in claim 25 wherein the cleaner is supported by the frame for axially reciprocating motion and including means for reciprocating the cleaner.

29. The invention defined in claim 25 and further including an auxiliary rotary separating element having a wall surrounding the grate adjacent the discharge end and disposed radially between the grate and the cleaner and partially axially overlapping a rearward portion of the cleaner separating element, the wall including foraminous portions and the auxiliary separating element including funnel means disposed radially outwards of and registering with the foraminous portions and including means for rotating the auxiliary separating element and wherein a second fraction of crop material expelled radially through the grate is intercepted by the auxiliary separating element and a part of said fraction passes radially through the foraminous portions and is expelled through the funnel means of said element.

30. The invention defined in claim 29 wherein the housing includes a circumferentially extending divider and front and rear walls extending radially inward from the outer wall and together defining a forward circumferentially extending clean grain channel and a rearward circumferentially extending tailings channel corresponding axially approximately with the cleaner separating element and the funnel means respectively for intercepting, respectively, crop material passing radially through the cleaner separating element and crop material being expelled through the funnel means.

31. The invention defined in claim 30 wherein the cleaner housing includes upwardly disposed openings communicating with the clean grain and tailings channels respectively and the combine further includes separate clean grain and tailings auger conveyors each having an axis approximately parallel to the rotor axis and a housing having a receiving opening, the conveyors being disposed above and adjacent an upper portion of the cleaner housing with the conveyor receiving openings in communication with the openings of the clean grain and tailings channels respectively.

32. The invention defined in claim 30 wherein the rotary cleaner carries a generally fore-and-aft extending paddle external to the cleaner separating element, said paddle having an outer portion disposed closely adjacent the inside of the cleaner housing outer wall and extending across the clean grain and tailings channels for impelling crop material circumferentially in said channels.

33. The invention defined in claim 29 wherein the auxiliary separating element is supported for axially reciprocating motion and including means for reciprocating said element and means for rotating it.

34. In an axial flow rotary separator for processing crop material, having a frame and opposite inlet and discharge ends and including a rotor and a grate surrounding the rotor and in which a portion of the crop material is expelled through the grate and including at least one sieve-like rotary cleaner element surrounding the grate for intercepting a first portion of the crop material expelled through the grate, and a fan coaxial with the rotor disposed adjacent the discharge end and operable to draw air axially over the cleaner element, the improvement comprising:
a rotary grain pan carried by the frame surrounding the grate towards the inlet end, disposed to receive a second portion of the crop material expelled through the grate and in a crop delivery relationship with the cleaner element and including an annular foraminous wall constituting an air inlet for said fan, said wall being disposed adjacent the inlet end of the cleaner element; and
means for rotating the rotary grain pan and for propelling the crop material received by the grain pan towards the discharge end for delivery to the cleaner element.

35. The invention defined in claim 34 wherein the grain pan and cleaner element are structurally connected and the means for propelling includes means for axially reciprocating the grain pan and cleaner element.

36. In an axial flow rotary separator for processing crop material having a frame and opposite inlet and discharge ends and including a rotor and a grate surrounding the rotor and a centrifugal fan coaxial with the rotor and disposed adjacent the discharge end, the fan including a wheel having an outside diameter greater than the grate and a plurality of blades for engaging crop material discharged axially by the rotor and grate and for discharging said material from the separator and being normally driven at a rotational speed higher than that of the rotor, the improvement comprising:
an inner discharge housing supported by the frame and having a generally annular wall of diameter less than the fan wheel disposed concentrically between the discharge end of the grate and the fan blades so that at least a portion of the crop material discharged axially by the rotor and grate passes through the discharge housing before being engaged by the fan blades; and
a plurality of hammers carried by the fan wheel and disposed so as to sweep inside the discharge housing and so as to engage at least a portion of the crop material passing through the housing for accelerating said material in the housing to a rotational speed approximating that of the fan wheel before it is engaged by the fan blades.

37. An axial flow rotary combine for harvesting and processing crop material comprising:
a mobile main frame;
a rotor rotatably mounted in the frame, having an approximately fore-and-aft and horizontal axis of rotation and a forward cylindrical portion and a rearward frusto-conical portion increasing in diameter towards the rear;
a separator grate supported by the frame closely surrounding the rotor and having forward inlet and rearward discharge ends and including cylindrical and frusto-conical portions corresponding with those of the rotor;
means for feeding crop material into the grate adjacent its inlet end to be engaged by the rotor;
a generally frusto-conical rotary grain pan and cleaner assembly surrounding the grate and including a forward grain pan portion and a rearward cleaner portion including chaffer elements adjacent and surrounding the grate and sieve elements disposed radially outwards of the chaffer elements, the chaffer and sieve elements having rearward tailings discharge ends forward of the grate discharge end;
an annular cleaner housing having a wall surrounding the cleaner elements and including a forward internal circumferential clean grain channel corresponding axially with the chaffer and sieve elements and a rearward internal circumferential tailings channel corresponding axially with the tailings discharge ends of the chaffer and sieve elements respectively, the internal surface of the housing wall defining the floors of said channels and said floors including clean grain and tailings discharge openings respectively;
a frusto-conical rotary chaffer cover surrounding the grate towards the discharge end and disposed internally of the chaffer elements and having a frusto-conical wall axially overlapping a rearward portion of the chaffer elements, said chaffer cover wall being at least partially foraminous and said chaffer cover carrying crop material diverter means registering with the foraminous portions of the chaffer cover wall and having a discharge opening corresponding axially with the tailings channel;

a centrifugal fan coaxial with the rotor adjacent the discharge end of the grate for drawing cleaning air axially through the cleaner housing; and drive means for rotating the rotor, grain pan and cleaner assembly, chaffer cover and fan at speeds such that crop material is propelled generally rearwards in the space between the rotor and grate, at least in part due to the interactions of centrifugal force and the divergence of the frusto-conical portion of the grate, and a portion of the material passes radially outwards through the grate to be intercepted by the grain pan and cleaner assembly and the chaffer cover, at least some material passing through the cleaner elements and moving outwards to the clean grain channel and at least some material passing through the chaffer cover and moving outwards to be diverted to the tailings channel by the diverter means.

38. The invention defined in claim 37 wherein the grain pan and cleaner assembly and chaffer cover are structurally connected and are supported by the frame for axial reciprocation with respect to the frame.

39. The invention defined in claim 37 and including a clean grain auger and a tailings auger, said augers having axes parallel to the rotor axis and being disposed above and adjacent the cleaner housing and respectively including housings having receiving openings in a crop material delivery relationship with the discharge openings of the clean grain and tailings channels respectively.

40. A combine harvester for harvesting and processing crop material comprising:

a mobile main frame;

an axial flow rotary separator carried by the frame and including a rotor having a generally fore-and-aft and horizontal axis of rotation and a grate surrounding the rotor and including a collecting housing surrounding a portion of the grate, an upper portion of said housing having an upwardly directed opening, said separator also including an annular rotary grain cleaner surrounding a portion of the grate and disposed at least partially within the collecting housing and operable to deliver clean grain to said opening;

a grain tank carried by the frame; and a conveyor in a grain receiving relationship with the opening and extending between the opening and the tank for conveying grain from the cleaner to the grain tank.

41. In a mobile machine for harvesting and processing crop material including gathering means for removing crop material from a field and a frame, an axial flow rotary separator for separating disparate constituents of the crop material comprising:

a first rotary separating element supported in the frame and having a longitudinal axis and including a generally axially extending at least partially foraminous circumferentially continuous wall generally concentric with the axis, the wall having an inner surface and opposite upstream and downstream ends;

means for receiving crop material from the gathering means and means for transferring at least part of the received material to the first rotary separating element so that it is engaged by the inner surface of said element;

means for rotating the separating element about its longitudinal axis at such a speed that crop material is held against the inner surface by centrifugal force; and means for axially reciprocating the separating element, the reciprocation at least in part propelling the crop material held against the inner surface towards the downstream end, a portion of the material passing through the wall and being expelled centrifugally therefrom and another portion being retained on the inner surface and moving towards the downstream end.

42. The invention described in claim 41 wherein the means for axially reciprocating the separating element includes a driven oscillating element drivingly connected to the separating element.

43. The invention defined in claim 41 and further comprising:

a second rotary separating element supported in the frame and including a circumferentially continuous at least partially foraminous wall surrounding the first separating element, the wall having an inner surface and a downstream end and being disposed so that at least part of the crop material passing through the wall of the first separating element and being expelled centrifugally therefrom is engaged by the inner surface of the second separating element;

means for rotating the second separating element about the longitudinal axis at such a speed that material on its inner surface is held there centrifugally; and means for axially reciprocating the second separating element, the reciprocation at least in part propelling crop material towards the downstream end, some material passing through the wall and being expelled centrifugally therefrom and some material being retained on the inner surface and moving towards the downstream end.

44. The invention defined in claim 43 wherein there is a phase difference between the reciprocations of the first and second separating elements.

45. The invention defined in claim 43 wherein the means for reciprocating the second separating element includes a pivot assembly connected between the first and second separating elements so that there is a fixed relationship between the reciprocations of the two elements.

46. The invention defined in claim 45 and further comprising means for maintaining a portion of the pivot assembly in a fixed axial relationship with the frame.

47. The invention defined in claim 43 wherein the means for transferring received crop material to the first separating element includes a rotary grain pan assembly having an outer wall and being mounted for rotation about the longitudinal axis, the wall having an inner surface for receiving at least part of the transferred crop material, means for rotating the grain pan assembly about its longitudinal axis at such a speed that crop material is held against its inner surface by centrifugal force, means for axially reciprocating the grain pan assembly, said reciprocation at least in part propelling crop material towards the first separating element, the grain pan being disposed so that material is delivered from it to the inner surface of the first separating element.

48. The invention defined in claim 47 wherein the rotary grain pan assembly includes a circumferential guide element and the means for reciprocating the grain pan assembly includes an axially reciprocating yoke at least partially surrounding the grain pan and engaging the guide element so that reciprocating motion is imparted by the yoke to the grain pan assembly as it rotates.

49. The invention defined in claim 47 wherein the inner surface of the grain pan assembly includes a plurality of spaced approximately axially extending ribs defining a plurality of side by side generally axially extending grain pans, a portion of the outer wall of the grain pan assembly constituting a floor for each grain pan.

50. The invention defined in claim 49 wherein the grain pan assembly is basically frusto-conical in form having a smaller diameter end and a larger diameter end, the crop material received on its inner surface being propelled in the direction of the larger diameter end and wherein at least a portion of the floor of each grain pan, measured circumferentially in the direction of rotation, diverges outwardly from the frusto-conical form.

51. The invention defined in claim 41 and further comprising:
a housing mounted for rotation about the longitudinal axis of the first rotary separating element and surrounding the upstream end of said element and having an annularly arranged plurality of air inlets communicating with the separating element adjacent said upstream end; and
a blower assembly supported by the frame, having a housing communicating with the separating element adjacent the downstream end and including a fan disposed so as to draw air from the inlets generally axially over the separating element so as to have a separating effect on crop material retained on the inner surface or passing through the wall of said element, aerodynamic forces overcoming centrifugal forces for at least a portion of the crop material.

52. The invention defined in claim 51 and further comprising:
a second rotary separating element supported in the frame and including a circumferentially continuous at least partially foraminous wall surrounding the first separating element, the wall having an inner surface and a downstream end and being disposed so that at least part of the crop material passing through the wall of the first separating element and being expelled centrifugally therefrom is engaged by the inner surface of the second separating element and wherein the fan is centrifugal and coaxial with the separating elements and the fan and air inlets are disposed so that air is drawn generally axially over the second separating element.

53. The invention defined in claim 41 and further comprising:
a collecting housing supported by the frame and surrounding the first separating element, the housing having an inside surface and a first discharge opening and being disposed so that material expelled centrifugally through the first separating element is intercepted by a first portion of the inside surface of the housing corresponding circumferentially with the first discharge opening;
a paddle for sweeping crop material over the inside surface of the housing; and
means for propelling the paddle over the inside surface of the housing in a circumferential path traversing the first discharge opening and at such a speed that crop material swept by the paddle is held against the inner surface of the housing by centrifugal force and moved towards the first discharge opening.

54. The invention defined in claim 53 wherein the housing further includes a second discharge opening and wherein at least part of the crop material moving towards the downstream end of the separating element wall reaches the end of said wall and is released centrifugally and intercepted by a second portion of the inside surface of the housing wall, said second portion corresponding circumferentially with the second discharge opening, and said crop material being swept by the paddle towards that opening.

55. The invention defined in claim 54 and further comprising:
a second rotary separating element including a circumferentially continuous, at least partially foraminous wall surrounding the first separating element, the wall having an inner surface and a downstream end and being disposed so that at least part of the crop material passing through the wall of the first separating element and being expelled centrifugally therefrom is intercepted by the inner surface of the second separating element, said element including a rigidly attached pivot block;
wherein the means for propelling the paddle includes a pivot bracket rigidly attached to the paddle and a generally radially disposed outwardly extending pivot arm having an inner end pivotally connected to the first rotary separating element and drivingly and pivotally engaging said pivot block and pivot bracket; and
wherein the housing includes a fixed continuous circumferential guide and the paddle includes a guide follower engaging the guide so that as the first separating element is rotated, the paddle is propelled circumferentially by the pivot arm and the pivot bracket remains axially fixed so that when the first separating element is reciprocated axially the pivot arm oscillates in the pivot bracket and thereby imparts an axial reciprocating motion to the second separating element through the pivot block.

56. In an axial flow rotary separator for a combine having an axis of rotation and including a rotating element having internal surfaces defining an approximately frusto-conical form rotating at such a speed that crop material received onto said surfaces is retained against the surfaces and propelled in the direction of increasing cone diameter at least partly by the action of centrifugal force, the improvement comprising:
a plurality of side by side axially extending trays carried by the element and providing at least part of said internal surfaces, each tray having at least a portion of its surface diverging from the frusto-conical form when measured circumferentially.

57. The invention defined in claim 56 wherein each tray includes intersecting planar surfaces including a trailing portion diverging circumferentially outwards as measured circumferentially in the direction of rotation and a leading portion, the line of intersection of the leading and trailing surfaces lying approximately in a longitudinal plane passing through the axis of the rotary separator.

58. The invention defined in claim 57 wherein the line of intersection of the planar surfaces is inclined in the direction of rotation as measured in the direction of increasing cone diameter.

59. In a combine for harvesting crop material and having a frame, an axial flow rotary separator for separating the harvested crop material comprising:
- a rotor mounted for rotation on the frame;
- a grate supported by the frame and surrounding the rotor so as to define an axially extending annular space between the rotor and the grate, said space having opposite inlet and discharge ends for receiving and discharging crop material respectively;
- means for rotating the rotor so that the rotor cooperates with the grate to propel harvested crop material received at the inlet end of the annular space in a generally spiral path towards the discharge end and to at least partially separate the crop material and expel a separated portion of said material, centrifugally through the foraminous wall of the grate;
- a rotary collector housing including a generally frusto-conical wall surrounding the grate towards the inlet end and having an upstream end adjacent the inlet end and an opposite downstream end and disposed to intercept separated crop material expelled through the grate;
- a rotary grain cleaner assembly including an at least partially foraminous generally frusto-conical wall surrounding the grate disposed to intercept separated crop material expelled through the grate and having opposite upstream and downstream ends, the upstream end being in a crop receiving relationship with the downstream end of the collector housing wall and said cleaner wall extending towards the discharge end;
- an auxiliary separating element having an at least partially foraminous generally frusto-conical wall surrounding the grate and disposed to intercept separated crop material expelled through the grate, said wall being disposed, radially, between the grate and the cleaner wall and having a downstream end adjacent the discharge end and extending towards the inlet end and axially overlapping the grain cleaner wall adjacent the downstream end of said wall;
- means for rotating the collector housing, grain cleaner assembly and auxiliary separating element at speeds such that crop material is held against their respective walls by centrifugal force; and
- means for agitating the collector housing, grain cleaner assembly and auxiliary separating element so that crop material intercepted by the walls of said elements moves towards the respective downstream ends.

60. In a combine having a frame and an axial flow rotary separator including rotary separating elements supported for rotation by the frame, an apparatus for axially reciprocating at least one of the rotary separating elements comprising:
- circumferential guide means carried by the rotary separating element generally concentric with the separator axis;
- a carriage arm including guide follower means for guidingly engaging the circumferential guide means and at least partially supporting the rotary separating element and maintaining a fixed axial and a fixed attitudinal relationship between the carriage arm and the rotary separating element, the carrige arm having a bearing bore transverse to the axis of rotation;
- a transverse carriage shaft housed in said bore;
- a torsionally resilient bushing lining the bore and gripping the carriage shaft and secured against rotation with respect to the bore and to the shaft;
- a fixed pivot housing carried by the combine frame having a transverse bearing bore approximately parallel to the bore of the carriage arm;
- a rocker arm assembly including a pivot shaft housed in the pivot housing and including a rocker arm having a drive portion including opposite ends connected rigidly and drivingly to the pivot shaft and the carriage shaft respectively;
- a torsionally resilient bushing lining the bore of the pivot housing and gripping the pivot shaft and secured against rotation with respect to the pivot housing bore and the pivot shaft; and
- means for imparting rotationally reciprocating motion to the pivot shaft and hence axially reciprocating motion to the rotary separating element.

61. The invention defined in claim 60 wherein the guide follower means forms a yoke embracing the rotary separating element and includes at least two guide follower elements engaging the guide means and spaced apart circumferentially at least 90°.

62. The invention defined in claim 60 wherein the rocker arm further includes a counterweight portion extending from the pivot shaft generally opposite to the drive portion.

* * * * *

UNITED STATES PATENT OFFICE
CERTIFICATE OF CORRECTION

Patent No. 4,198,802            Dated 22 April 1980

Inventor(s) Edward J. Hengen and John E. Wilson

It is certified that error appears in the above-identified patent and that said Letters Patent are hereby corrected as shown below:

Column 29, lines 43-45, delete ", aerodynamic forces overcoming centrifugal forces for at least a portion of the crop material".

Signed and Sealed this

Twenty-sixth Day of August 1980

[SEAL]

*Attest:*

SIDNEY A. DIAMOND

*Attesting Officer*      *Commissioner of Patents and Trademarks*